(12) United States Patent
DeWard et al.

(10) Patent No.: US 8,531,278 B2
(45) Date of Patent: *Sep. 10, 2013

(54) ACCESSORY SYSTEM FOR VEHICLE

(75) Inventors: Joshua L. DeWard, Holland, MI (US); Steven L. Brown, Grand Haven, MI (US); Kenneth Schofield, Holland, MI (US); Niall R. Lynam, Holland, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 831 days.

This patent is subject to a terminal disclaimer.

(21) Appl. No.: 12/753,433

(22) Filed: Apr. 2, 2010

(65) Prior Publication Data

US 2010/0208077 A1    Aug. 19, 2010

Related U.S. Application Data

(60) Division of application No. 12/354,339, filed on Jan. 15, 2009, now Pat. No. 7,719,408, which is a continuation of application No. 11/201,661, filed on Aug. 11, 2005, now Pat. No. 7,480,149, and a continuation-in-part of application No. 12/052,341, filed on Mar. 20, 2008, now Pat. No. 7,579,940, which is a continuation of application No. 11/625,374, filed on Jan. 22, 2007, now Pat. No. 7,579,939, which is a continuation of application No. 10/755,915, filed on Jan. 13, 2004, now Pat. No. 7,446,650, which is a continuation of application No. 09/793,002, filed on Feb. 26, 2001, now Pat. No. 6,690,268, said application No. 12/354,339 is a continuation-in-part of application No. 12/061,372, filed on Apr. 2, 2008, now Pat. No. 7,619,508, which is a continuation of application No. 12/043,567, filed on Mar. 6, 2008, now Pat. No. 7,731,403, which is a division of application No. 11/623,997, filed on Jan. 17, 2007, now Pat. No. 7,344,284, which is a continuation of application No. 10/054,633, filed on Jan. 22, 2002, now Pat. No. 7,195,381, which is a continuation-in-part of application No. 09/793,002, filed on Feb. 26, 2001, now Pat. No. 6,690,268.

(60) Provisional application No. 60/522,123, filed on Aug. 18, 2004, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000, provisional application No. 60/346,733, filed on Jan. 7, 2002, provisional application No. 60/263,680, filed on Jan. 23, 2001, provisional application No. 60/271,466, filed on Feb. 26, 2001, provisional application No. 60/315,384, filed on Aug. 28, 2001.

(51) Int. Cl.
*B60Q 1/00* (2006.01)
*H05K 5/00* (2006.01)

(52) U.S. Cl.
USPC ........ 340/425.5; 340/438; 348/148; 362/494; 361/728; 361/752

(58) Field of Classification Search
USPC ...................................... 340/425.5
See application file for complete search history.

(56) References Cited

U.S. PATENT DOCUMENTS

| | | |
|---|---|---|
| 2,414,223 A | 1/1947 | De Virgilis |
| 3,870,404 A | 3/1975 | Wilson et al. |
| 4,065,750 A | 12/1977 | Duncan et al. |
| 4,274,078 A | 6/1981 | Isobe et al. |
| 4,286,305 A | 8/1981 | Pilat et al. |
| 4,443,057 A | 4/1984 | Bauer et al. |
| 4,646,210 A | 2/1987 | Skogler et al. |
| 4,646,673 A | 3/1987 | Fordyce |
| 4,733,336 A | 3/1988 | Skogler et al. |
| 4,760,497 A | 7/1988 | Roston |
| 4,768,135 A | 8/1988 | Kretschmer et al. |
| 4,781,436 A | 11/1988 | Armbruster |

| | | |
|---|---|---|
| 4,793,690 A | 12/1988 | Gahan et al. |
| 4,807,096 A | 2/1989 | Skogler et al. |
| 4,859,867 A | 8/1989 | Larson et al. |
| 4,863,130 A | 9/1989 | Marks, Jr. |
| 4,871,917 A | 10/1989 | O'Farrell et al. |
| 4,886,960 A | 12/1989 | Molyneux et al. |
| 4,891,559 A | 1/1990 | Matsumoto et al. |
| 4,895,097 A | 1/1990 | Lechnir |
| 4,916,374 A | 4/1990 | Schierbeek et al. |
| 4,930,742 A | 6/1990 | Schofield et al. |
| 4,936,533 A | 6/1990 | Adams et al. |
| 4,956,591 A | 9/1990 | Schierbeek et al. |
| 4,967,319 A | 10/1990 | Seko |
| 4,973,844 A | 11/1990 | O'Farrell et al. |
| 5,058,851 A | 10/1991 | Lawlor et al. |
| 5,100,095 A | 3/1992 | Haan et al. |
| 5,140,455 A | 8/1992 | Varaprasad et al. |
| 5,151,816 A | 9/1992 | Varaprasad et al. |
| 5,178,448 A | 1/1993 | Adams et al. |
| 5,193,029 A | 3/1993 | Schofield et al. |
| 5,255,442 A | 10/1993 | Schierbeek et al. |
| 5,264,997 A | 11/1993 | Hutchisson et al. |
| 5,266,873 A | 11/1993 | Arditi et al. |
| 5,327,288 A | 7/1994 | Wellington et al. |
| 5,330,149 A | 7/1994 | Haan et al. |
| D351,370 S | 10/1994 | Lawlor et al. |
| 5,361,190 A | 11/1994 | Roberts |
| 5,371,659 A | 12/1994 | Pastrick et al. |
| 5,377,949 A | 1/1995 | Haan et al. |
| 5,426,294 A | 6/1995 | Kobayashi et al. |
| 5,439,305 A | 8/1995 | Santo |
| 5,455,716 A | 10/1995 | Suman et al. |
| 5,469,298 A | 11/1995 | Suman et al. |
| 5,475,366 A | 12/1995 | Van Lente et al. |
| 5,487,522 A | 1/1996 | Hook |
| 5,488,352 A | 1/1996 | Jasper |
| 5,497,306 A | 3/1996 | Pastrick |
| 5,521,760 A | 5/1996 | De Young et al. |
| 5,530,240 A | 6/1996 | Larson et al. |
| 5,537,003 A | 7/1996 | Bechtel et al. |
| 5,550,677 A | 8/1996 | Schofield et al. |
| 5,566,224 A | 10/1996 | Azam et al. |
| 5,570,127 A | 10/1996 | Schmidt |
| 5,572,354 A | 11/1996 | Desmond et al. |
| 5,576,687 A | 11/1996 | Blank et al. |
| 5,582,383 A | 12/1996 | Mertens et al. |
| 5,587,236 A | 12/1996 | Agrawal et al. |
| 5,609,652 A | 3/1997 | Yamada et al. |
| 5,615,857 A | 4/1997 | Hook |
| 5,631,638 A | 5/1997 | Kaspar et al. |
| 5,632,551 A | 5/1997 | Roney et al. |
| 5,649,756 A | 7/1997 | Adams et al. |
| 5,654,686 A | 8/1997 | Geschke et al. |
| 5,659,423 A | 8/1997 | Schierbeek et al. |
| 5,660,454 A | 8/1997 | Mori et al. |
| 5,661,455 A | 8/1997 | Van Lente et al. |
| 5,666,157 A | 9/1997 | Aviv |
| 5,669,698 A | 9/1997 | Veldman et al. |
| 5,669,705 A | 9/1997 | Pastrick et al. |
| 5,671,996 A | 9/1997 | Bos et al. |
| 5,689,241 A | 11/1997 | Clarke, Sr. et al. |
| 5,691,848 A | 11/1997 | Van Lente et al. |
| 5,703,568 A | 12/1997 | Hegyi |
| 5,708,410 A | 1/1998 | Blank et al. |
| 5,708,743 A | 1/1998 | DeAndrea et al. |
| 5,774,283 A | 6/1998 | Nagel et al. |
| 5,786,772 A | 7/1998 | Schofield et al. |
| 5,796,094 A | 8/1998 | Schofield et al. |
| 5,796,176 A | 8/1998 | Kramer et al. |
| 5,798,575 A | 8/1998 | O'Farrell et al. |
| 5,820,097 A | 10/1998 | Spooner |
| 5,820,245 A | 10/1998 | Desmond et al. |
| 5,825,283 A | 10/1998 | Camhi |
| 5,837,891 A | 11/1998 | Bridge |
| 5,845,000 A | 12/1998 | Breed et al. |
| 5,863,116 A | 1/1999 | Pastrick et al. |
| 5,878,353 A | 3/1999 | ul Azam et al. |
| 5,910,854 A | 6/1999 | Varaprasad et al. |
| 5,923,027 A | 7/1999 | Stam et al. |
| 5,926,087 A | 7/1999 | Busch et al. |
| 5,940,503 A | 8/1999 | Palett et al. |
| 5,947,586 A | 9/1999 | Weber |
| 5,971,552 A | 10/1999 | O'Farrell et al. |
| 6,000,823 A | 12/1999 | Desmond et al. |
| 6,006,159 A | 12/1999 | Schmier et al. |
| 6,020,704 A | 2/2000 | Buschur |
| 6,028,537 A | 2/2000 | Suman et al. |
| 6,056,410 A | 5/2000 | Hoekstra et al. |
| 6,087,942 A | 7/2000 | Sleichter, III et al. |
| 6,087,953 A | 7/2000 | DeLine et al. |
| 6,089,721 A | 7/2000 | Schierbeek |
| 6,097,023 A | 8/2000 | Schofield |
| 6,097,024 A | 8/2000 | Stam et al. |
| 6,100,798 A | 8/2000 | Liang |
| 6,108,084 A | 8/2000 | Winner |
| 6,124,647 A | 9/2000 | Marcus et al. |
| 6,124,886 A | 9/2000 | DeLine et al. |
| 6,151,065 A | 11/2000 | Steed et al. |
| 6,158,655 A | 12/2000 | DeVries, Jr. et al. |
| 6,166,625 A | 12/2000 | Teowee et al. |
| 6,166,698 A | 12/2000 | Turnbull et al. |
| 6,170,955 B1 | 1/2001 | Campbell et al. |
| 6,172,613 B1 | 1/2001 | DeLine et al. |
| 6,176,602 B1 | 1/2001 | Pastrick et al. |
| 6,198,087 B1 | 3/2001 | Boon |
| 6,198,409 B1 | 3/2001 | Schofield et al. |
| 6,207,967 B1 | 3/2001 | Hochstein |
| 6,210,008 B1 | 4/2001 | Hoekstra et al. |
| 6,222,460 B1 | 4/2001 | DeLine et al. |
| 6,229,226 B1 | 5/2001 | Kramer et al. |
| 6,229,434 B1 | 5/2001 | Knapp et al. |
| 6,243,003 B1 | 6/2001 | DeLine et al. |
| 6,250,148 B1 | 6/2001 | Lynam |
| 6,259,359 B1 | 7/2001 | Fujinami et al. |
| 6,276,821 B1 | 8/2001 | Pastrick et al. |
| 6,278,377 B1 | 8/2001 | DeLine et al. |
| 6,291,905 B1 | 9/2001 | Drummond et al. |
| 6,294,989 B1 | 9/2001 | Schofield et al. |
| 6,296,379 B1 | 10/2001 | Pastrick |
| 6,299,316 B1 | 10/2001 | Fletcher et al. |
| 6,299,319 B1 | 10/2001 | Mertens et al. |
| 6,305,807 B1 | 10/2001 | Schierbeek |
| 6,313,454 B1 | 11/2001 | Bos et al. |
| 6,318,697 B1 | 11/2001 | Corrado et al. |
| 6,320,176 B1 | 11/2001 | Schofield et al. |
| 6,323,477 B1 | 11/2001 | Blasing et al. |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,013 B1 | 1/2002 | Battiti et al. |
| 6,341,523 B2 | 1/2002 | Lynam |
| 6,353,392 B1 | 3/2002 | Schofield et al. |
| 6,366,213 B2 | 4/2002 | DeLine et al. |
| 6,386,742 B1 | 5/2002 | DeLine et al. |
| 6,392,218 B1 | 5/2002 | Kuehnle |
| 6,406,152 B1 | 6/2002 | Hoekstra et al. |
| 6,412,973 B1 | 7/2002 | Bos et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,452,148 B1 | 9/2002 | Bendicks et al. |
| 6,466,136 B2 | 10/2002 | DeLine et al. |
| 6,477,464 B2 | 11/2002 | McCarthy et al. |
| 6,496,117 B2 | 12/2002 | Gutta et al. |
| 6,498,967 B1 | 12/2002 | Hopkins et al. |
| 6,501,387 B2 | 12/2002 | Skiver et al. |
| 6,513,252 B1 | 2/2003 | Schierbeek et al. |
| 6,516,664 B2 | 2/2003 | Lynam |
| 6,545,598 B1 | 4/2003 | De Villeroche |
| 6,555,804 B1 | 4/2003 | Blasing |
| 6,564,122 B1 | 5/2003 | Huertgen et al. |
| 6,587,573 B1 | 7/2003 | Stam et al. |
| 6,593,565 B2 | 7/2003 | Heslin et al. |
| 6,596,978 B2 | 7/2003 | Hochstein |
| 6,603,137 B2 | 8/2003 | Hochstein |
| 6,614,043 B2 | 9/2003 | Hochstein |
| 6,615,650 B2 | 9/2003 | Mahner et al. |

| | | | |
|---|---|---|---|
| 6,617,564 B2 | 9/2003 | Ockerse et al. | |
| 6,646,359 B2 | 11/2003 | Schaefer et al. | |
| 6,648,477 B2 | 11/2003 | Hutzel et al. | |
| 6,653,615 B2 | 11/2003 | Bechtel et al. | |
| 6,660,360 B2 | 12/2003 | Mertzel et al. | |
| 6,672,744 B2 | 1/2004 | DeLine et al. | |
| 6,672,745 B1 | 1/2004 | Bauer et al. | |
| 6,690,268 B2 | 2/2004 | Schofield et al. | |
| 6,731,071 B2 | 5/2004 | Baarman | |
| 6,734,904 B1 | 5/2004 | Boon et al. | |
| 6,737,963 B2 | 5/2004 | Gutta et al. | |
| 6,738,088 B1 | 5/2004 | Uskolovsky et al. | |
| 6,742,904 B2 | 6/2004 | Bechtel et al. | |
| 6,742,905 B2 | 6/2004 | Suyama et al. | |
| 6,765,480 B2 | 7/2004 | Tseng | |
| 6,768,092 B2 | 7/2004 | Sakata | |
| 6,774,356 B2 | 8/2004 | Heslin et al. | |
| 6,774,810 B2 | 8/2004 | DeLine et al. | |
| 6,784,129 B2 | 8/2004 | Seto et al. | |
| 6,799,904 B2 | 10/2004 | Schaefer et al. | |
| 6,803,574 B2 | 10/2004 | Abel et al. | |
| 6,806,485 B2 | 10/2004 | Jackson, Jr. | |
| 6,812,645 B2 | 11/2004 | Baarman | |
| 6,824,281 B2 | 11/2004 | Schofield et al. | |
| 6,825,620 B2 | 11/2004 | Kuennen et al. | |
| 6,831,268 B2 | 12/2004 | Bechtel et al. | |
| 6,831,288 B1 | 12/2004 | Schmitt et al. | |
| 6,832,719 B2 | 12/2004 | DeVries, Jr. et al. | |
| 6,841,767 B2 | 1/2005 | Mindl et al. | |
| 6,867,510 B2 | 3/2005 | Kramer et al. | |
| 6,877,870 B2 | 4/2005 | Krug | |
| 6,877,888 B2 | 4/2005 | DeLine et al. | |
| 6,889,064 B2 | 5/2005 | Baratono et al. | |
| 6,894,619 B1 | 5/2005 | Schmitt et al. | |
| 6,917,163 B2 | 7/2005 | Baarman | |
| 6,924,470 B2 | 8/2005 | Bechtel et al. | |
| 6,930,593 B2 | 8/2005 | Crawshaw | |
| 6,968,736 B2 | 11/2005 | Lynam | |
| 6,975,215 B2 | 12/2005 | Schofield et al. | |
| 6,975,390 B2 | 12/2005 | Mindl et al. | |
| 6,980,092 B2 | 12/2005 | Turnbull et al. | |
| 6,995,354 B2 | 2/2006 | Hagen et al. | |
| 7,004,593 B2 | 2/2006 | Weller et al. | |
| 7,041,965 B2 | 5/2006 | Heslin et al. | |
| 7,053,761 B2 | 5/2006 | Schofield et al. | |
| 7,075,511 B1 | 7/2006 | Mousseau et al. | |
| 7,108,409 B2 | 9/2006 | DeLine et al. | |
| 7,111,996 B2 | 9/2006 | Seger et al. | |
| 7,188,963 B2 | 3/2007 | Schofield et al. | |
| 7,195,381 B2 | 3/2007 | Lynam et al. | |
| 7,199,767 B2 | 4/2007 | Spero | |
| 7,205,524 B2 | 4/2007 | Drummond et al. | |
| 7,242,320 B2 | 7/2007 | Lawlor et al. | |
| 7,249,860 B2 | 7/2007 | Kulas et al. | |
| 7,255,451 B2 | 8/2007 | McCabe et al. | |
| 7,255,465 B2 | 8/2007 | DeLine et al. | |
| 7,262,406 B2 | 8/2007 | Heslin et al. | |
| 7,265,342 B2 | 9/2007 | Heslin et al. | |
| 7,289,037 B2 | 10/2007 | Uken et al. | |
| 7,297,932 B2 | 11/2007 | Georgiadis et al. | |
| 7,304,680 B2 | 12/2007 | Köhler et al. | |
| 7,311,428 B2 | 12/2007 | DeLine et al. | |
| 7,322,755 B2 | 1/2008 | Neumann et al. | |
| 7,370,983 B2 | 5/2008 | DeWind et al. | |
| 7,420,159 B2 | 9/2008 | Heslin et al. | |
| 7,438,774 B2 | 10/2008 | Kurfiss et al. | |
| 7,446,427 B2 | 11/2008 | Parker et al. | |
| 7,460,007 B2 | 12/2008 | Schofield et al. | |
| 7,467,883 B2 | 12/2008 | DeLine et al. | |
| 7,480,149 B2 | 1/2009 | DeWard et al. | |
| 7,490,944 B2 | 2/2009 | Blank et al. | |
| 7,497,632 B2 | 3/2009 | Kajino et al. | |
| 7,538,316 B2 | 5/2009 | Heslin et al. | |
| 7,570,793 B2 | 8/2009 | Lages et al. | |
| 7,609,961 B2 | 10/2009 | Park | |
| 7,646,889 B2 | 1/2010 | Tsukamoto | |
| 7,651,228 B2 | 1/2010 | Skiver et al. | |
| 7,657,052 B2 | 2/2010 | Larson et al. | |
| 7,658,521 B2 | 2/2010 | DeLine et al. | |
| 7,697,028 B1 | 4/2010 | Johnson | |
| 7,719,408 B2 | 5/2010 | DeWard et al. | |
| 7,728,721 B2 | 6/2010 | Schofield et al. | |
| 7,780,137 B2 | 8/2010 | Hansel et al. | |
| 7,780,454 B2 | 8/2010 | Baranski | |
| 7,811,011 B2 | 10/2010 | Blaesing et al. | |
| 7,817,205 B2 | 10/2010 | Schulte et al. | |
| 7,837,173 B2 | 11/2010 | Zinzer et al. | |
| 7,855,353 B2 | 12/2010 | Blaesing et al. | |
| 7,855,755 B2 | 12/2010 | Weller et al. | |
| 7,860,275 B2 | 12/2010 | Leleve et al. | |
| 7,864,981 B2 | 1/2011 | Leleve et al. | |
| 7,888,629 B2 | 2/2011 | Heslin et al. | |
| 7,889,086 B2 | 2/2011 | Schafer et al. | |
| 7,911,356 B2 | 3/2011 | Wohlfahrt et al. | |
| 7,914,188 B2 | 3/2011 | DeLine et al. | |
| 7,916,009 B2 | 3/2011 | Schofield et al. | |
| 7,940,305 B2 | 5/2011 | Adameck | |
| 7,965,336 B2 | 6/2011 | Bingle et al. | |
| 7,994,471 B2 | 8/2011 | Heslin et al. | |
| 8,051,707 B2 | 11/2011 | Roehr et al. | |
| 8,094,002 B2 | 1/2012 | Schofield et al. | |
| 8,134,117 B2 | 3/2012 | Heslin et al. | |
| 8,179,437 B2 | 5/2012 | Schofield et al. | |
| 8,192,095 B2 | 6/2012 | Kortan et al. | |
| 8,256,821 B2 | 9/2012 | Lawlor et al. | |
| 8,288,711 B2 | 10/2012 | Heslin et al. | |
| 8,309,907 B2 | 11/2012 | Heslin et al. | |
| 8,325,028 B2 | 12/2012 | Schofield et al. | |
| 8,339,453 B2 | 12/2012 | Blake, III et al. | |
| 2002/0075387 A1 | 6/2002 | Janssen | |
| 2002/0126457 A1 | 9/2002 | Kameyama | |
| 2002/0159270 A1 | 10/2002 | Lynam et al. | |
| 2004/0200948 A1 | 10/2004 | Bos et al. | |
| 2005/0195488 A1 | 9/2005 | McCabe et al. | |
| 2005/0237385 A1 | 10/2005 | Kosaka et al. | |
| 2006/0050018 A1 | 3/2006 | Hutzel et al. | |
| 2006/0061008 A1 | 3/2006 | Karner et al. | |
| 2007/0132610 A1 | 6/2007 | Guernalec et al. | |
| 2007/0235638 A1 | 10/2007 | Backes et al. | |
| 2008/0092673 A1 | 4/2008 | Hansel et al. | |
| 2009/0122430 A1 | 5/2009 | DeWard et al. | |
| 2010/0208077 A1 | 8/2010 | DeWard et al. | |
| 2011/0155874 A1 | 6/2011 | Roehr et al. | |
| 2012/0224065 A1 | 9/2012 | Schofield et al. | |
| 2012/0310519 A1 | 12/2012 | Lawlor et al. | |

FOREIGN PATENT DOCUMENTS

| | | |
|---|---|---|
| DE | 3525672 | 1/1987 |
| DE | 3605704 | 8/1987 |
| DE | 3605704 A1 | 8/1987 |
| DE | 9306989 | 7/1993 |
| DE | 4214223 | 11/1993 |
| DE | 4329983 | 3/1995 |
| DE | 29513369 | 12/1995 |
| DE | 19647200 | 1/1998 |
| DE | 29805142 | 6/1998 |
| DE | 19755008 | 7/1999 |
| DE | 10132982 | 1/2003 |
| DE | 10211444 | 10/2003 |
| DE | 10237554 | 3/2004 |
| DE | 10237607 | 3/2004 |
| DE | 10342837 | 4/2005 |
| DE | 102005002686 | 8/2006 |
| DE | 102005015973 | 10/2006 |
| DE | 102006039065 | 3/2007 |
| EP | 0461424 | 12/1991 |
| EP | 0667254 | 8/1995 |
| EP | 0928723 | 7/1999 |
| EP | 0969275 | 1/2000 |
| EP | 1376051 | 1/2004 |
| EP | 1389565 | 2/2004 |
| GB | 2210835 | 6/1989 |
| GB | 2316379 | 2/1998 |
| JP | 59029539 | 2/1984 |
| JP | 62043543 | 2/1987 |
| JP | 11131880 | 5/1999 |
| JP | 11254925 | 9/1999 |
| WO | WO 9814974 | 4/1998 |

| | | |
|---|---|---|
| WO | WO 9914088 | 3/1999 |
| WO | WO 9923828 | 5/1999 |
| WO | WO 2004/047421 A3 | 6/2004 |

OTHER PUBLICATIONS

"Combination of rain sensing, autolamps and telephone antenna in one module," Research Disclosure, Kenneth Mason Publications, Hampshire, GB No. 412, Aug. 1998, p. 1045XP-000824825.
N.R. Lynam, "Electrochromic Automotive Day/Night Mirror," *SAE Technical Paper Series*, 870636 (1987).
N.R. Lynam, "Smart Windows for Automobiles," *SAE Technical Paper Series*, 900419 (1990).
N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

*Primary Examiner* — Donnie Crosland
(74) *Attorney, Agent, or Firm* — Gardner, Linn, Burkhart & Flory, LLP

(57) ABSTRACT

An accessory system for a vehicle includes a windshield that has a mounting element adhesively attached to its inner surface, an interior rearview mirror assembly, and an accessory support adapted for mounting to and demounting from the mounting element. The accessory support includes an accessory receiving portion configured to receive an accessory. The accessory support may comprise part of the interior rearview mirror assembly or may include a mirror mounting element with the interior rearview mirror assembly adapted for mounting to the mirror mounting element of the accessory support. The accessory comprises an imaging sensor and the accessory receiving portion is configured to receive the imaging sensor in a manner that compensates for the windshield angle of the windshield so that the imaging sensor has a more generally horizontal forward field of view through the windshield when the accessory support is mounted to the mounting element.

40 Claims, 12 Drawing Sheets

ACCESSORY SYSTEM FOR VEHICLE

CROSS REFERENCE TO RELATED APPLICATIONS

The present application is a division of U.S. patent application Ser. No. 12/354,339, filed Jan. 15, 2009, now U.S. Pat, No. 7,719,408, which is a continuation of U.S. patent application Ser. No. 11/201,661, filed Aug. 11, 2005, now U.S. Pat. No. 7,480,149, which claims benefit of U.S. provisional application Ser. No. 60/522,123, filed Aug. 18, 2004, which are hereby incorporated herein by reference in their entireties, and U.S. patent application Ser. No. 12/354,339 is a continuation-in-part of U.S. patent application Ser. No. 12/052,341, filed Mar. 20, 2008, now U.S. Pat. No. 7,579,940, which is a continuation of U.S. patent application Ser. No. 11/625,374, filed Jan. 22, 2007, now U.S. Pat. No. 7,579,939, which is a continuation of U.S. patent application Ser. No. 10/755,915, filed Jan. 13, 2004, now U.S. Pat. No. 7,446,650, which is a continuation of U.S. patent application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000, and U.S. patent application Ser. No. 12/354,339 is a continuation-in-part of U.S. patent application Ser. No. 12/061,372, filed Apr. 2, 2008, now U.S. Pat. No. 7,619,508, which is a continuation of U.S. patent application Ser. No. 12/043,567, filed Mar. 6, 2008, now U.S. Pat, No. 7,731,403, which is a division of U.S. patent application Ser. No. 11/623,997, filed Jan. 17, 2007, now U.S. Pat. No. 7,344,284, which is a continuation of U.S. patent application Ser. No. 10/054,633, filed Jan. 22, 2002, now U.S. Pat. No. 7,195,381, which claims benefit of U.S. provisional applications Ser. No. 60/346,733, filed Jan. 7, 2002; Ser. No. 60/263,680, filed Jan. 23, 2001; Ser. No. 60/271,466, filed Feb. 26, 2001; and Ser. No. 60/315,384, filed Aug. 28, 2001, and which is a continuation-in-part of U.S. patent application Ser. No. 09/793,002, filed Feb. 26, 2001, now U.S. Pat. No. 6,690,268, and U.S. patent application Ser. No. 12/354,339 is a continuation-in-part of U.S. patent application Ser. No. 12/405,614, filed Mar. 17, 2009 by Taylor et al., now U.S. Pat. No. 7,711,479, which is a continuation of U.S. patent application Ser. No. 11/935,800, filed Nov. 6, 2007, now U.S. Pat. No. 7,571,042, which is a continuation of U.S. patent application Ser. No. 11/624,381, filed Jan. 18, 2007, now U.S. Pat. No. 7,490,007, which is a continuation of U.S. patent application Ser. No. 10/645,762, filed Aug. 20, 2003, now U.S. Pat. No. 7,167,796, which claims priority of U.S. provisional applications, Ser. No. 60/406, 166, filed Aug. 27, 2002; Ser. No. 60/405,392, filed Aug. 23, 2002; and Ser. No. 60/404,906, filed Aug. 21, 2002, and which is a continuation-in-part of U.S. patent application Ser. No. 10/456,599, filed Jun. 6, 2003 by Weller et al., now U.S. Pat. No. 7,004,593, and which is a continuation-in-part of U.S. pat. application Ser. No. 10/287,178, filed Nov. 4, 2002 by McCarthy et al., now U.S. Pat. No. 6,678,614, which is a continuation of U.S. patent application Ser. No. 09/799,414, filed Mar. 5, 2001, now U.S. Pat. No. 6,477,464, which claims priority of U.S. provisional application Ser. No. 60/187,960, filed Mar. 9, 2000.

FIELD OF THE INVENTION

The present invention relates to accessory modules for vehicles and, more particularly, to an accessory module that is mountable or positionable at an interior surface of a windshield of a vehicle.

BACKGROUND OF THE INVENTION

It is known in the art to attach an accessory module to an interior surface of a windshield of a vehicle. Often, such modules include a camera that has a forward facing field of view through the windshield. The camera typically has a lens attached thereto, and is mounted to a mounting plate of the module so that the camera has the desired field of view when the module is attached to the windshield. While such accessory modules provide the desired results, they often include multiple components that are often difficult to arrange so that the desired field of view is provided by the camera when the accessory module is attached to the window. Also, the camera and lens are often provided together as a unit, which may be difficult for an electronics supplier, who often prefers to provide the camera or imaging sensor on a printed circuit board.

SUMMARY OF THE INVENTION

The present invention provides an accessory module or windshield electronics module that houses an accessory, such as an imaging sensor or imaging device, such as an imaging array chip, such as a CMOS or CCD imaging sensor or the like. The accessory module is attachable to a mounting element attached or adhered or otherwise secured to the interior surface of a windshield of a vehicle. The accessory module includes a holding portion that receives or holds the imaging sensor and a lens and circuitry, such as a printed circuit board or the like, and that includes an electrical connector that electrically connects to the circuitry when the circuitry is received by the module. The holding portion is integrally or unitarily molded of a polymeric or plastic material so that the lens, imaging sensor and circuitry may be readily attached to the holding portion at the desired location and/or orientation.

According to an aspect of the present invention, an accessory module for a vehicle includes a mounting element securable to an interior surface of a windshield of a vehicle, and an accessory support having a base portion attachable to the mounting element. The accessory support includes an accessory holding element configured to hold an accessory, at least one circuitry holding element configured to hold a printed circuit board at the accessory support, and an electrical connector for electrically connecting the printed circuit board and the accessory to an electrical source or power source or control of the vehicle. The base portion, the accessory holding element and the circuitry holding element are integrally molded together so that the accessory support comprises a unitarily molded accessory support. The accessory module includes a cover portion attachable to the accessory support to substantially encompass the accessory and the printed circuit board within the accessory module.

The electrical connector may comprise a plurality of conducting members insert molded within a connecting portion of the accessory support. The connecting portion may be unitarily or integrally molded with the base portion, the accessory holding element and the circuitry holding element. The conducting members may be configured to engage the printed circuit board as the printed circuit board is mounted at the circuitry holding element.

The printed circuit board may include an imaging sensor positioned thereon, and the accessory holding element may include a recessed portion for receiving the imaging sensor when the printed circuit board is mounted at the circuitry holding element. The accessory holding element may also include a lens mounting portion configured to mount a lens. The lens mounting portion and the imaging sensor receiving portion or recessed portion may be arranged so that the imaging sensor received in the imaging sensor receiving portion is generally perpendicular to a longitudinal axis of a lens mounted at the lens mounting portion. The lens mounting portion may be arranged at an angle relative to the base portion so that the lens is directed at a desired angle when the accessory module is attached to a windshield of a vehicle.

Therefore, the present invention provides an accessory module that has a unitarily molded or formed accessory support. The accessory support may support an imaging sensor or device and a lens, and may support other accessories as well. The unitarily molded accessory support readily receives the accessory and circuitry to ease assembly of the accessory module. The assembled accessory support, with the accessory or accessories and associated circuitry mounted thereon, may be readily attached to a mounting element or button at the windshield of the vehicle. When so attached, the imaging sensor and lens are oriented at the desired angle to provide the desired or appropriate field of view through the windshield of the vehicle. Because the accessory support of the accessory module is unitarily formed, there are fewer components, which eases the assembly of the accessory module and deproliferates parts in the assembly plant. Different accessory supports having different lens mounting angles may be provided to accommodate different windshield angles, depending on the particular application of the accessory module.

These and other objects, advantages, purposes and features of the present invention will become apparent upon review of the following specification in conjunction with the drawings.

DESCRIPTION OF THE PREFERRED EMBODIMENTS

Figure 1:
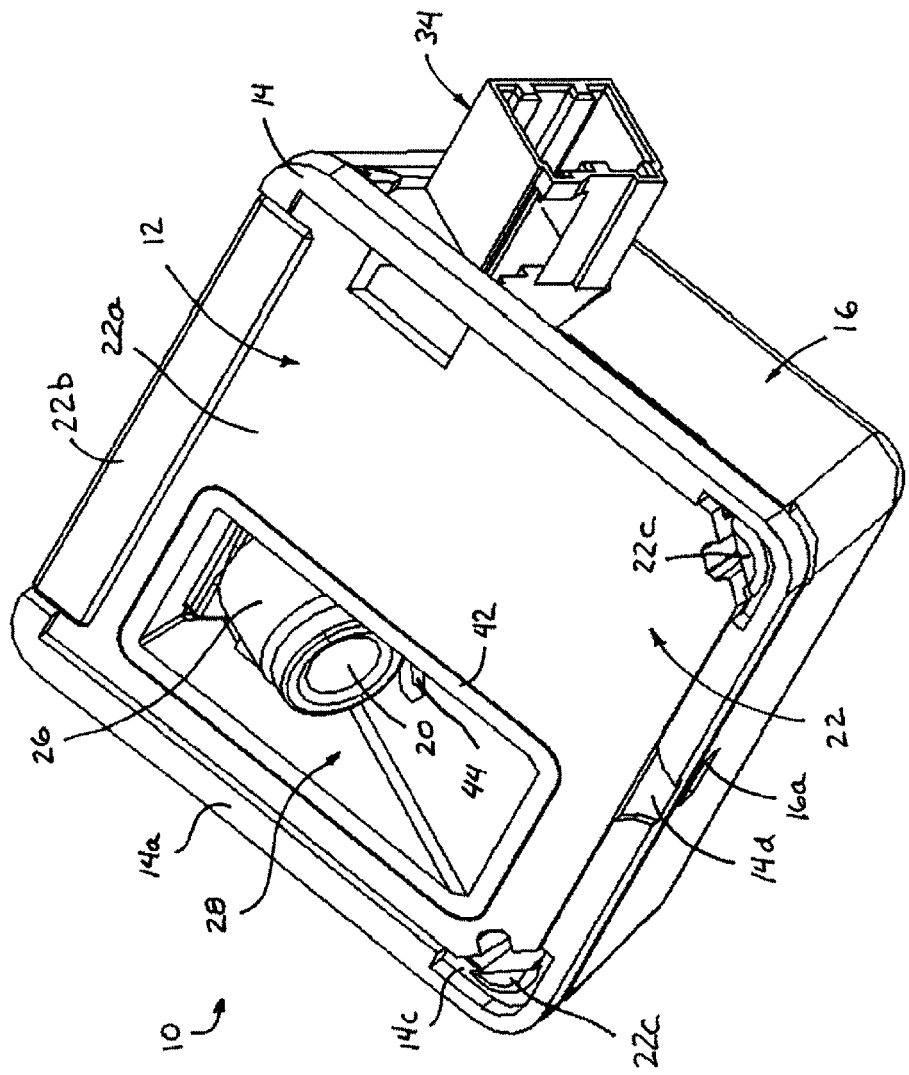
FIG. 1 is a perspective view of an accessory module in accordance with the present invention, as viewed through a windshield when mounted at a windshield of a vehicle.

Referring now to the drawings and the illustrative embodiments depicted therein, an accessory module or windshield electronics module 10 includes an accessory holding portion or carrier member or support portion 12 that is attachable to a mounting element or attachment member or button 14 attached or secured to an interior surface of a windshield of a vehicle (FIGS. 1-5). Accessory module 10 includes a housing or casing or cover portion 16 that may attach to carrier portion 12 to substantially encase or contain an accessory within accessory module 10. Carrier portion 12 is a unitarily or integrally molded element that receives and/or holds an accessory, such as an imaging sensor 18 (FIG. 10) and a lens 20, such that the imaging sensor and lens are directed or facing through the windshield of the vehicle and provide the desired field of view forwardly of the vehicle when the accessory module is mounted at the windshield of the vehicle, as discussed below. The accessory module is preferably positioned at or near the interior rearview mirror assembly of the vehicle and preferably is positioned at an area of the windshield that is cleaned or wiped by a windshield wiper of the vehicle when the windshield wipers are activated.

Figure 2:
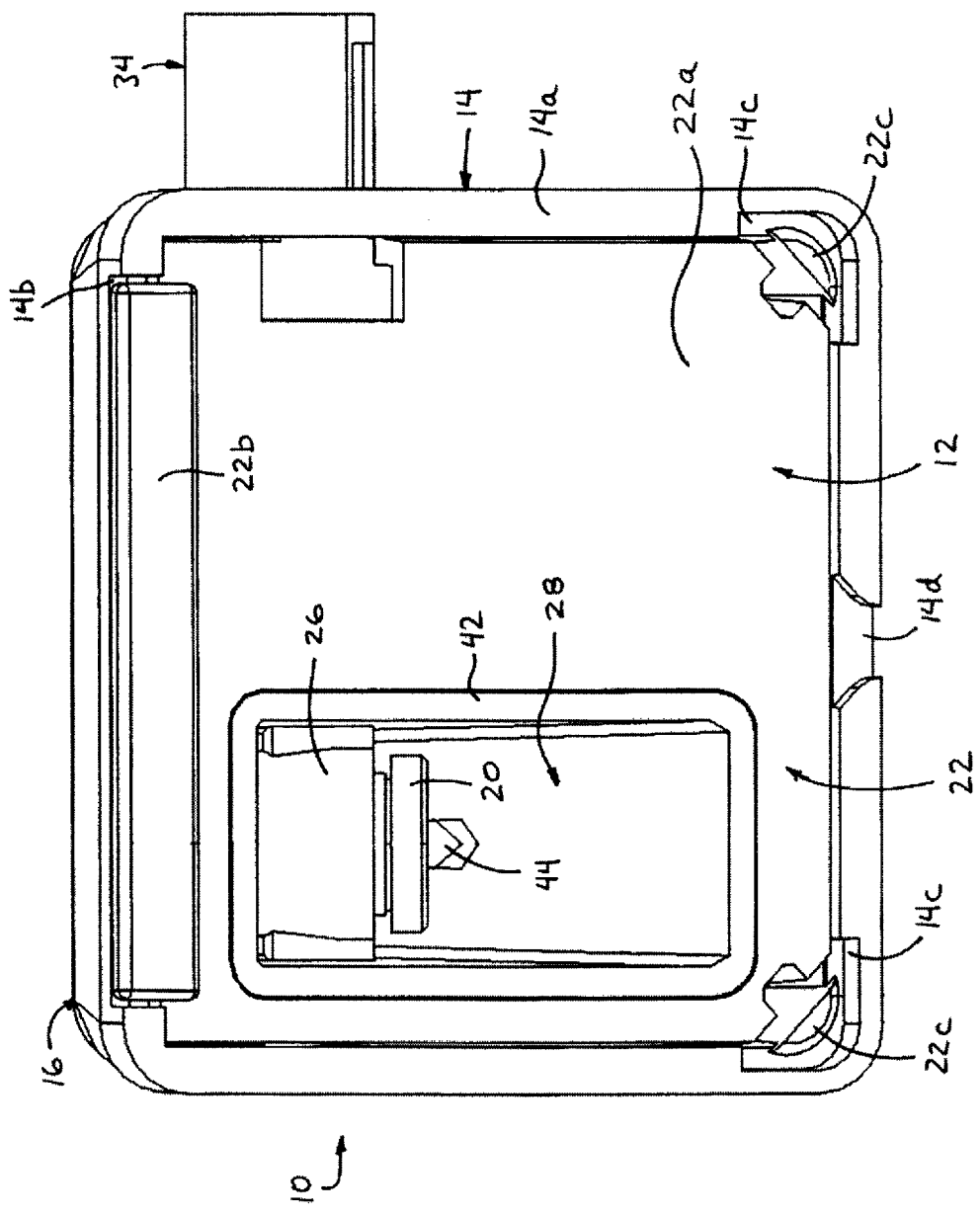
FIG. 2 is a perspective view of the accessory module of FIG. 1, as viewed through the windshield.
Figure 3:
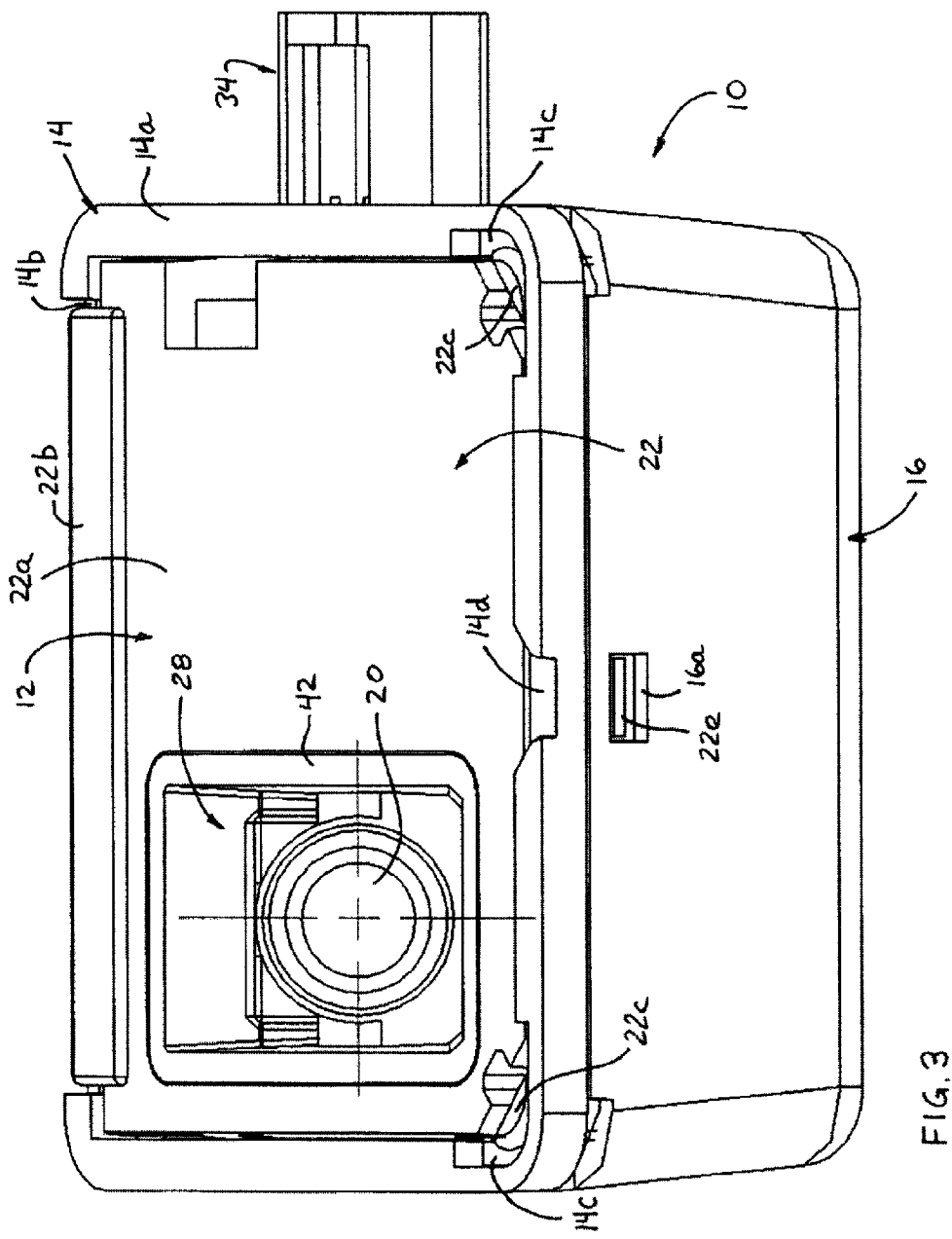
FIG. 3 is a perspective view of the accessory module of FIGS. 1 and 2, as viewed through the windshield and along the imaging device.
Figure 4:
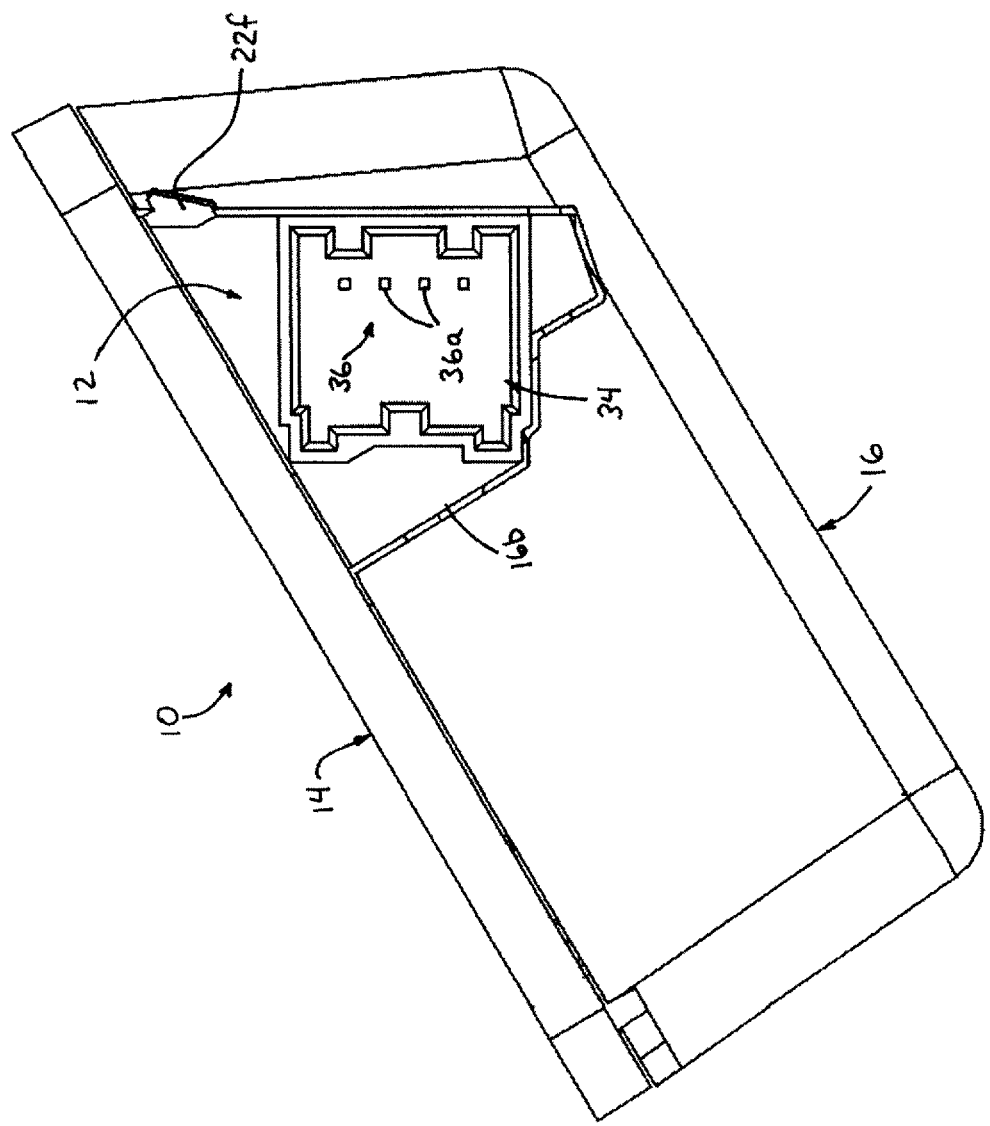
FIG. 4 is a side elevation of the accessory module of FIGS. 1-3.

Mounting element or attachment member 14 is adhered to or bonded to or otherwise attached or mounted or secured to an interior surface of a windshield of a vehicle. In the illustrated embodiment, mounting element 14 is a generally rectangular or square-shaped ring defining a generally planar or flat surface 14a, which is positioned against the interior surface of the windshield when mounting element 14 is attached to the windshield. As can be seen in FIGS. 2 and 3, mounting element 14 may include a narrowed portion 14b along one side and two narrowed portions 14c at the opposite corners for receiving attaching portions of the carrier portion 12, such that the attaching portions are positioned between the mounting element 14 and the windshield, as discussed below. Mounting element 14 may also include another narrowed portion 14d along a lower side of the mounting element 14 to provide a channel or drain for moisture to exit the accessory module 10, in the event any moisture or condensation forms within the accessory module. Optionally, the mounting element may comprise other shapes or features, or may be other types of elements, such as similar to those described in U.S. patent application, Ser. No. 10/355,454, filed Jan. 31, 2003 by Schofield et al. for VEHICLE ACCESSORY MODULE, now U.S. Pat. No. 6,824,281, which is hereby incorporated herein by reference, without affecting the scope of the present invention. The mounting element is thus attachable to the windshield and configured to receive the carrier portion 12 of the accessory module.

Figure 6:
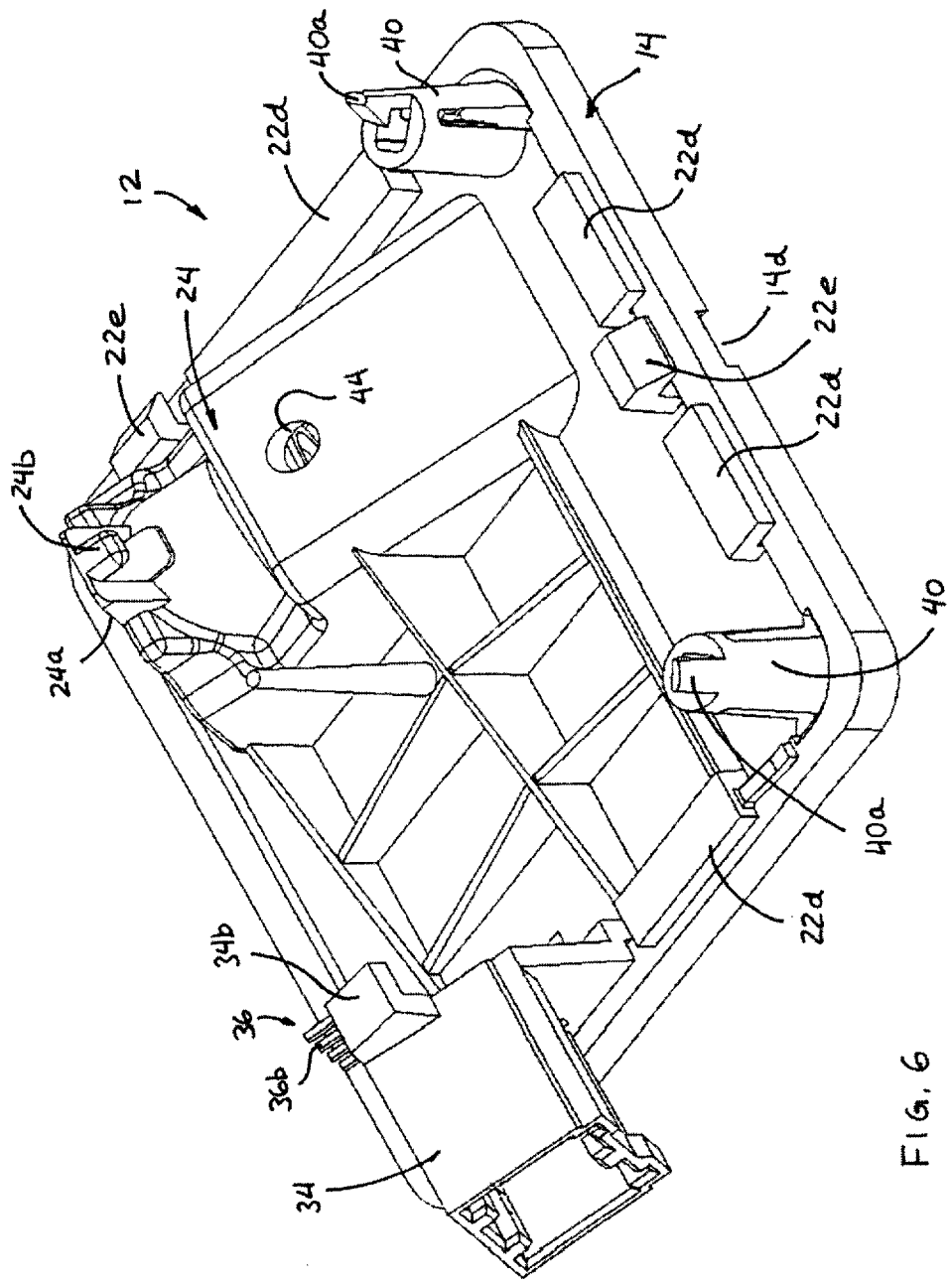
FIG. 6 is a perspective view of an accessory support or holder and mounting element useful with the accessory module of FIGS. 1-5.

Carrier portion 12 includes a base portion 22 that has a surface or face 22a that generally faces the windshield when carrier portion 12 is attached to mounting element 14 at the windshield. As shown in FIGS. 1-3, 6 and 10, base portion 22 includes a tab or flange 22b that is positionable at the narrowed portion 14b of mounting element 14, while the opposite corners of base portion 22 include flexible tabs or snaps or clasps 22c, which are received at narrowed portions 14c of mounting element 14, such that carrier portion 12 may be readily attached or snapped to mounting element 14 when mounting element 14 is attached to the windshield. The flexible tabs 22c also facilitate detachment of carrier portion 12 from the windshield mounting element 14 in case maintenance or replacement of the accessory and/or circuitry is needed. Base portion 22 may also include one or more guides or flanges 22d (FIGS. 6, 8 and 9) that may overlap the lower side and/or lateral sides of the mounting element 14 when positioned at the mounting element 14 to assist in retaining the carrier portion 12 at the mounting element 14. Base portion 22 may also include one or more flexible snaps or clasps 22e extending therefrom (as best shown in FIG. 6) for snapping or securing casing or cover portion 16 to carrier portion 12, as discussed below.

Carrier portion 12 includes an accessory mounting or holding portion 24 that protrudes upward from carrier portion 12 (as shown in FIG. 6) for mounting the accessory or accessories of the accessory module. Accessory mounting portion 24 includes a lens receiving or lens mounting portion 26 for receiving lens 20. Lens mounting portion 26 may be threaded so that the lens 20 may be threaded onto lens mounting portion 26 a desired amount. Optionally, the lens may be otherwise mounted or attached to the lens mounting portion, such as via a snap retention or a retaining ring or the like, without affecting the scope of the present invention. Lens mounting portion 26 may be positioned within a recess 28 defined by accessory mounting portion 24 so that lens 20 is positioned within the recess and generally at the windshield and directed through the windshield when carrier portion 12 is attached to mounting element 14 at the windshield. The lens mounting portion 26 may be angled relative to the angle of the base portion 22 of carrier portion 12 to provide the desired angle of the lens 20 relative to the windshield of the vehicle. The angle may be selected to position the lens generally horizontally when the accessory module is attached to the windshield and may vary depending on the angle of the windshield for the particular application of the accessory module.

Figure 10:
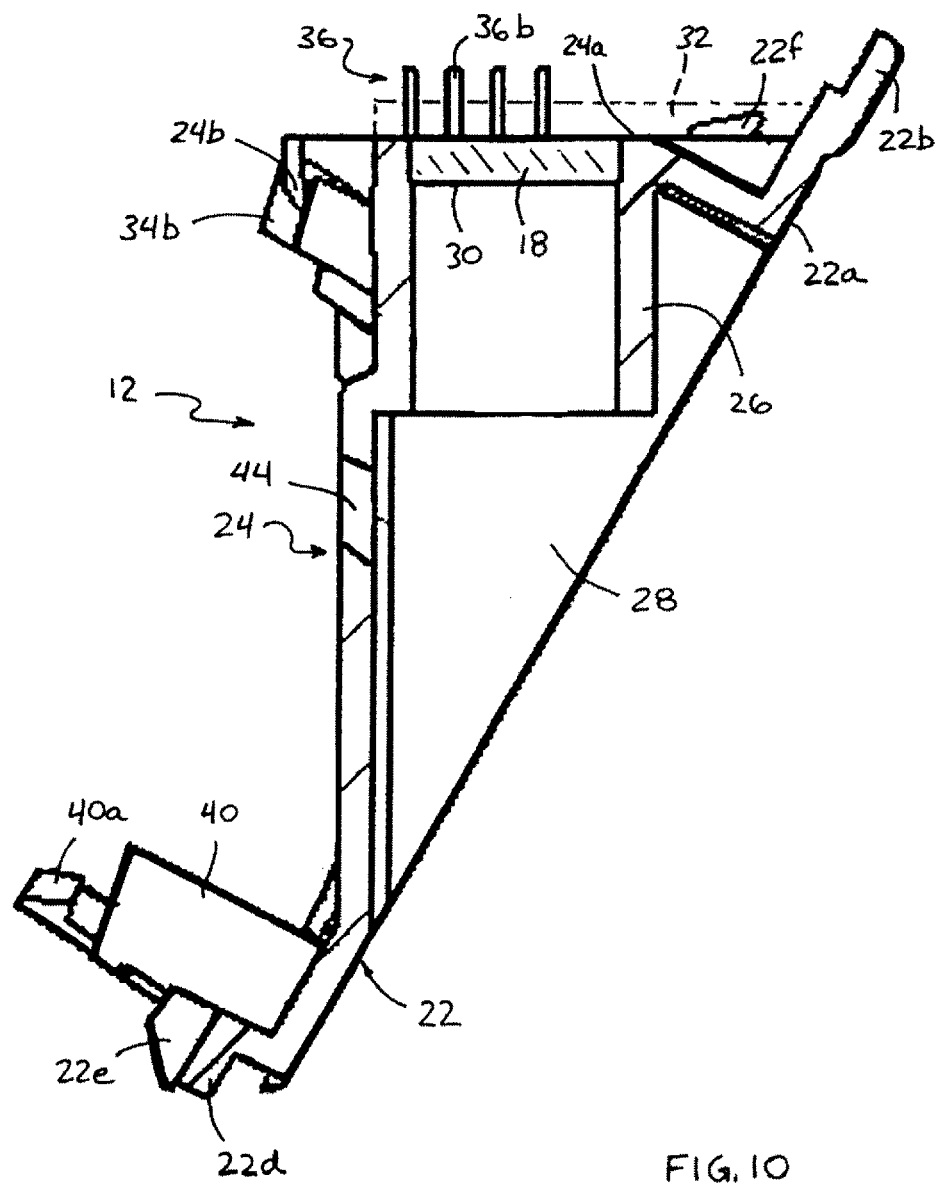
FIG. 10 is a sectional view of the accessory support or holder taken along the line X-X in FIG. 9, with the mounting element removed from the accessory support.

As shown in FIG. 10, accessory mounting portion 24 may define a sensor receiving portion or recess 30, such as at the rearward end of the lens receiving portion 26. The sensor receiving portion 30 is configured to receive imaging sensor 18 therein so that imaging sensor 18 is positioned generally parallel to the plane of the lens 20 (or, in other words, so that the imaging sensor is positioned generally perpendicular to a longitudinal axis of the lens held by the lens receiving portion). Preferably, accessory mounting portion 24 defines or provides a generally flat or planar mounting surface 24a that is spaced from and that may be generally parallel to the sensor receiving portion 30. The imaging sensor 18 thus may be provided on a printed circuit board 32 (FIGS. 7 and 8), which may be readily positioned at the appropriate location on carrier portion 12 with the imaging sensor 18 positioned within sensor receiving portion 30, where the mounting surface 24a, the recess 30 and the connector 34 (discussed below) function to hold the circuitry or circuit board at the accessory support or carrier portion 12.

The imaging sensor may comprise an imaging array sensor, such as a CMOS sensor or a CCD sensor or the like, such as described in U.S. Pat. Nos. 5,550,677; 5,670,935; 5,796,094; 6,498,620; 5,877,897; 6,396,397; and 6,313,454, and U.S. patent application, Ser. No. 10/421,281, filed Apr. 23, 2003 by Schofield for AUTOMATIC HEADLAMP CONTROL, now U.S. Pat. No. 7,004,606, which are hereby incorporated herein by reference. The imaging sensor may comprise a video chip that is mounted on the printed circuit board so that the imaging sensor and circuit board may be provided as a unit from an electronics supplier. The lens may comprise any suitable lens for focusing an image of the exterior scene onto the imaging plane of the imaging sensor. For example, the lens may comprise a lens of the types disclosed in U.S. Pat. Nos. 6,757,109; 6,717,610; 6,590,719; and 6,201,642, which are hereby incorporated herein by reference. Imaging sensor 18 and lens 20 may be implemented with or incorporated in a forward viewing imaging system, such as an imaging system utilizing the principles disclosed in U.S. Pat. Nos. 5,550,677; 5,670,935; 5,760,962; 5,786,772; 5,798,575; 5,796,094; 5,914,815; 5,929,786; 5,949,331; 5,959,367; 6,175,164; 6,198,409; 6,201,642; 6,222,447; 6,396,397; 6,498,620; 6,717,610; and/or 6,757,109; and/or in U.S. patent applications, Ser. No. 10/422,512, filed Apr. 24, 2003 by Schofield for DRIVING SEPARATION DISTANCE INDICATOR, now U.S. Pat. No. 7,123,168; and/or Ser. No. 10/418,486, filed Apr. 18, 2003 by McMahon et al. for VEHICLE IMAGING SYSTEM, now U.S. Pat. No. 7,005,974, which are all hereby incorporated herein by reference in their entireties. Optionally, the imaging system may function as an automatic headlamp control, such as a headlamp control of the types described in U.S. Pat. Nos. 5,796,094; 5,715,093; 6,742,904; 6,653,615; 6,587,573; 6,831,268; and/or 6,924,470, which are hereby incorporated herein by reference. Optionally, the imaging system may also or otherwise function a lane departure warning system, an object detection system, a traffic lane control system, a lane change assist system, a blind spot detection system or an adaptive cruise control system or the like, such as the types described in U.S. Pat. Nos. 5,929,786 and/or 5,786,772; and/or U.S. patent applications, Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 10/209,173, filed Jul. 31, 2002 by Schofield for AUTOMOTIVE LANE CHANGE AID, now U.S. Pat. No. 6,882,287; and/or U.S. provisional application, Ser. No. 60/638,687, filed Dec. 23, 2004 by Higgins-Luthman for OBJECT DETECTION SYSTEM FOR VEHICLE, which are hereby incorporated herein by reference. Optionally, the imaging system may also or otherwise function as a precipitation sensor or rain sensor, such as the types disclosed in commonly assigned U.S. Pat. Nos. 6,353,392; 6,313,454; and/or 6,320,176, which are hereby incorporated herein by reference. The imaging sensor may be optically coupled with or may contact the interior surface of the windshield, or the imaging sensor may be a non-contacting sensor and thus spaced from the interior surface of the windshield, without affecting the scope of the present invention. Optionally, the imaging system may also or otherwise function as a traffic sign recognition system (such as the types described in U.S. provisional application, Ser. No. 60/562,480, filed Apr. 15, 2004 and U.S. patent application, Ser. No. 11/105,757, filed Apr. 14, 2005, now U.S. Pat. No. 7,526,103, which are hereby incorporated herein by reference), or a system for determining a distance to a leading vehicle or object, such as by utilizing the principles disclosed in U.S. Pat. No. 6,396,397, which is hereby incorporated herein by reference, or a collision avoidance system, such as the types disclosed in U.S. Pat. No. 6,411,204, which is hereby incorporated herein by reference, or other vehicle vision or imaging system and/or the like.

Carrier portion 12 also includes a connector 34, such as a multi-pin connector or plug or socket, for electrically connecting the accessory module 10 to an electrical wire or cable or lead (not shown) of the vehicle or of the interior rearview mirror assembly of the vehicle or of another accessory module or console or the like of the vehicle. The socket portion of connector 34 is integrally or unitarily molded with carrier portion 12 and may extend outward from the accessory module 10 when the accessory module is assembled and positioned at the windshield (as shown in FIGS. 1-5).

Figure 7:
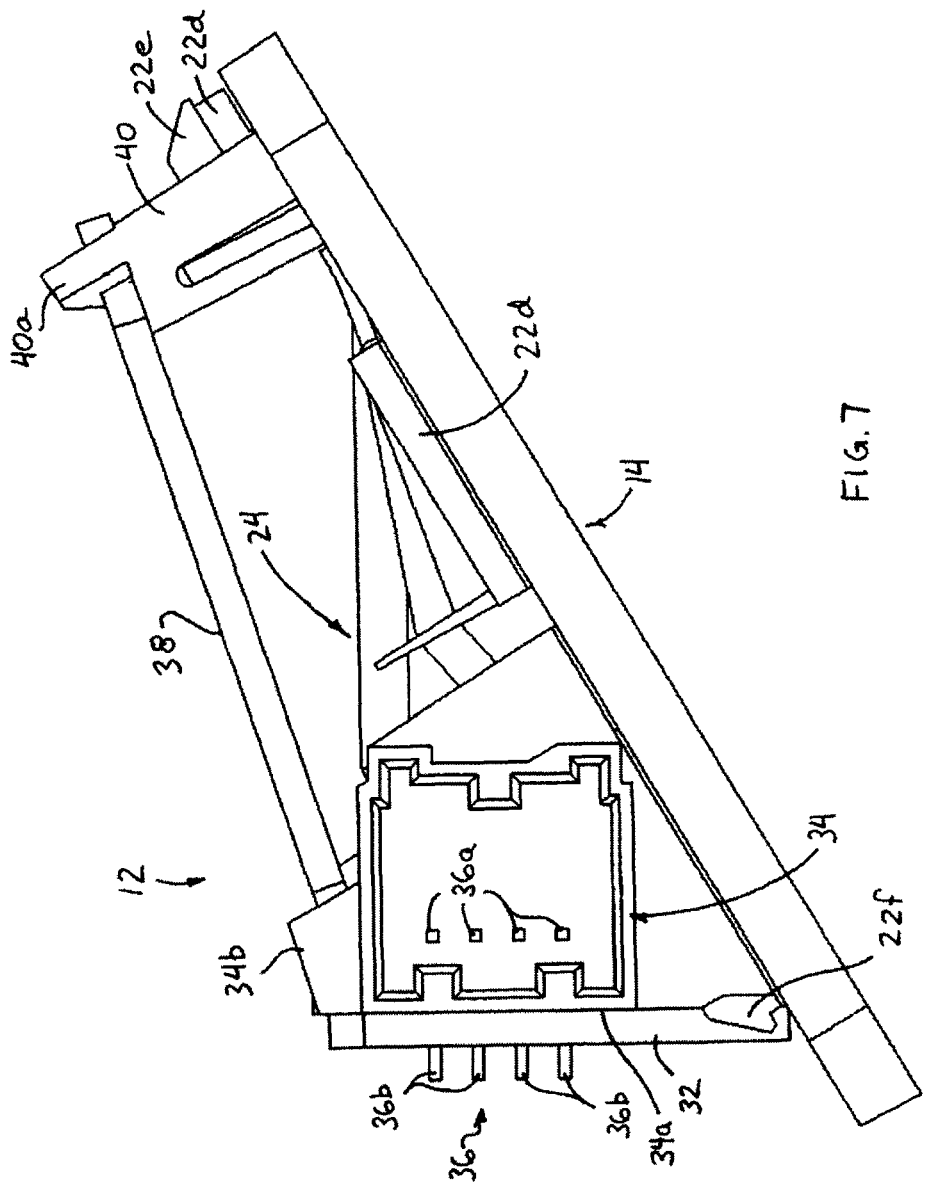
FIG. 7 is a side elevation of the accessory support and mounting element of FIG. 6.
Figure 8:
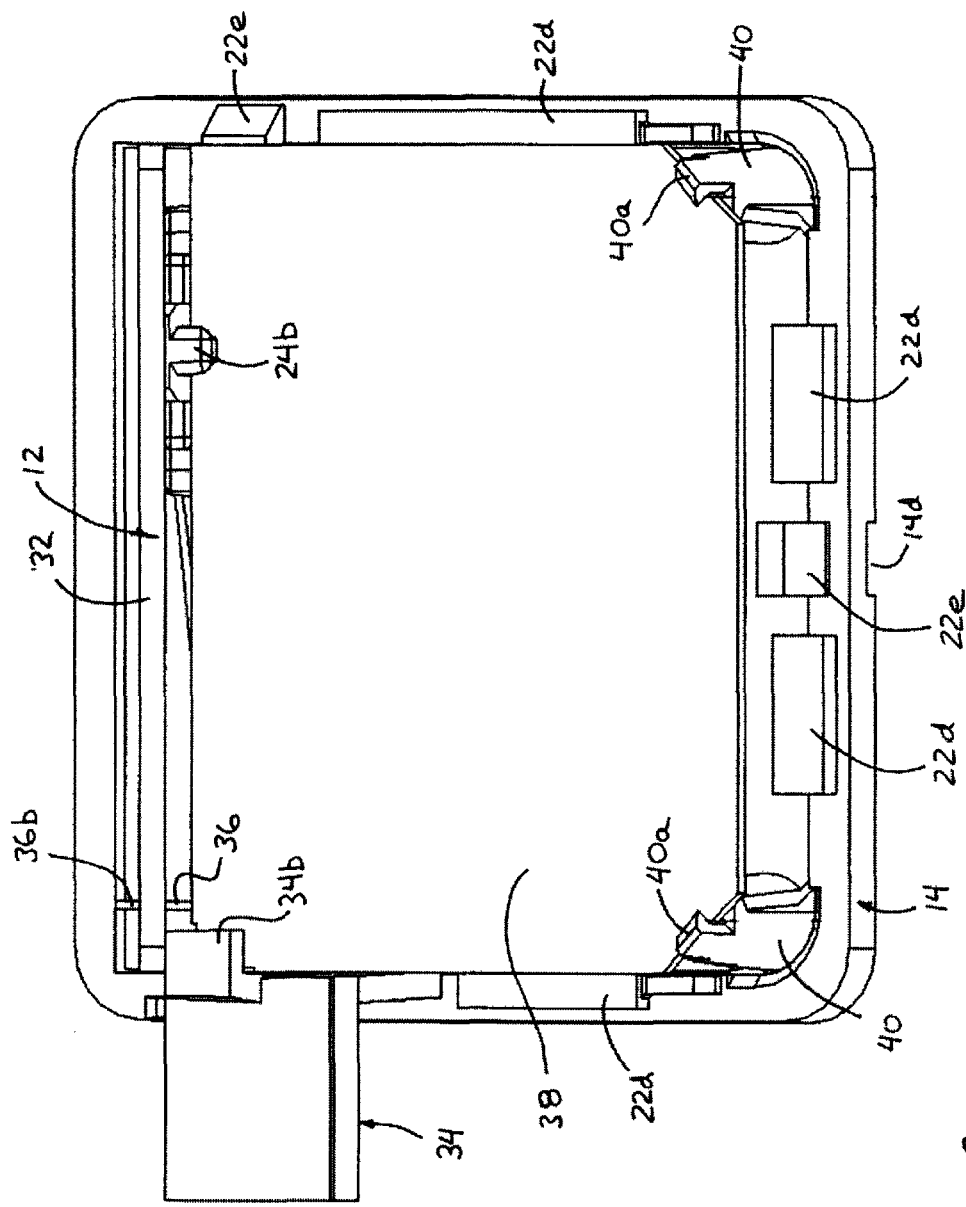
FIG. 8 is a perspective view of the accessory support and mounting element of FIGS. 6 and 7, with a printed circuit board mounted thereon.
Figure 9:
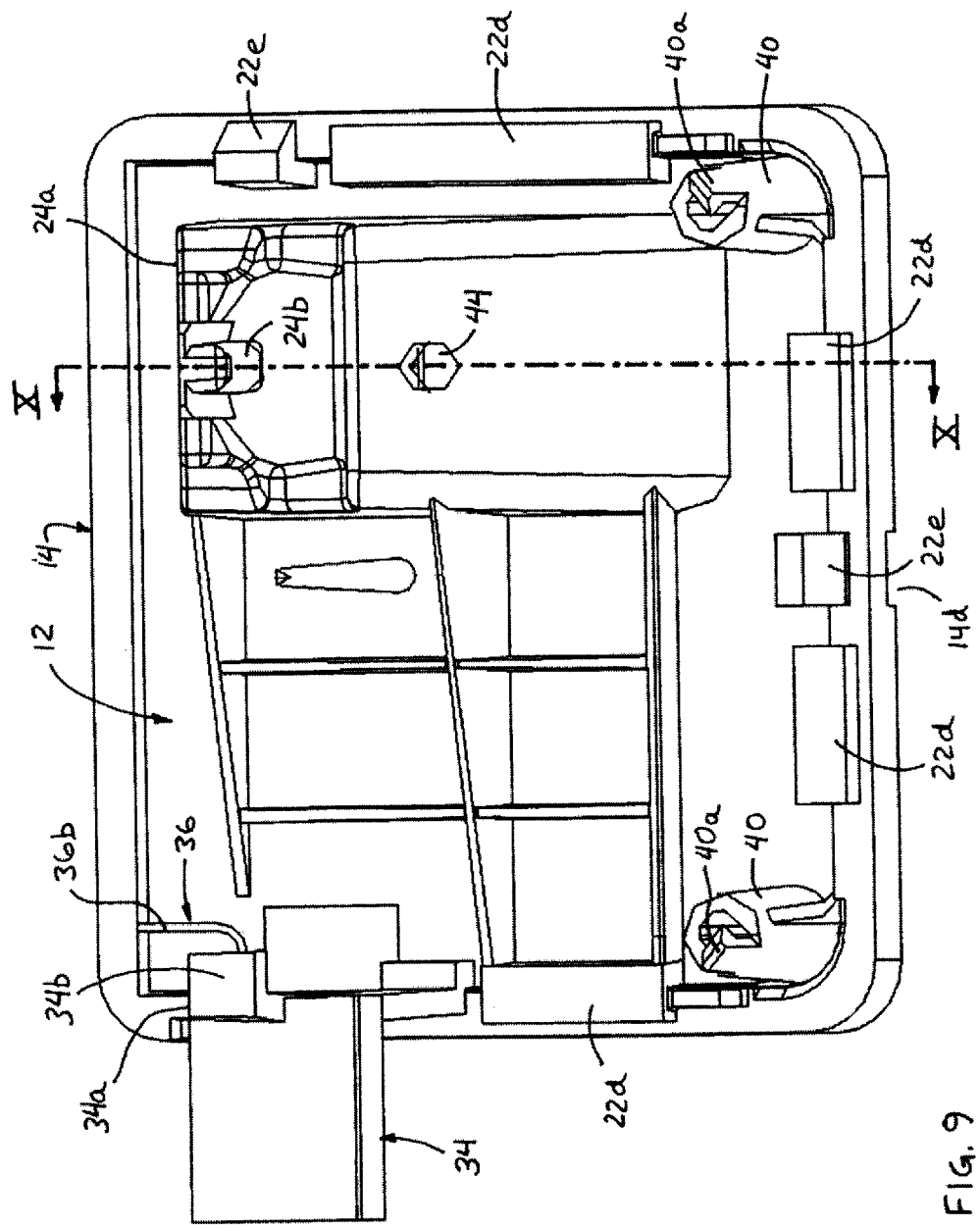
FIG. 9 is the same perspective view as FIG. 8, with the printed circuit board removed to show additional details.

As can be seen with reference to FIGS. 6-10, carrier portion 12 may include electrically conducting terminals or pins or elements 36, which may be insert molded at and partially in and through connector 34. The ends 36a (FIGS. 4 and 7) of elements 36 may be positioned within the socket portion of connector 34 so as to be readily connected to the external wire or cable or lead, while the opposite ends 36b of elements 36 may extend from connector 34 and may be positioned to engage or insert through circuit board 32 (as shown in FIGS. 7 and 8) when circuit board 32 is positioned at mounting surface 24a of accessory mounting portion 24. As can be seen in FIG. 7, the connector 34 may also define a generally planar mounting surface 34a against which the circuit board 32 may be positioned to properly orient the circuit board 32 at the desired or appropriate angle or position. The carrier portion 12 thus provides a unitary molded portion that provides for mounting and positioning of the lens and imaging sensor, and that provides for electrical connection of the circuitry and accessory and/or sensor to an external wire or cable or the like.

Optionally, carrier portion 12 may also receive or mount a second circuit board 38, which may include additional accessories or circuitry. As shown in FIGS. 6-10, carrier portion 12 may include a pair of stanchions or pillars or mounting posts 40 extending upward from the base portion 22, while accessory mounting portion 24 may include a receiving tab 24b. Receiving tab 24b may receive an edge or perimeter portion or region of the circuit board 38, while the mounting posts 40 may receive an opposite edge or perimeter portion or region of circuit board 38 to retain the circuit board at the carrier portion 12. Mounting posts 40 may include flexible tabs or snaps or clasps 40a to allow for insertion of the circuit board in place at the carrier portion. As can be seen in FIGS. 6, 8 and 10, the connector 34 may include a flange or lip 34b that is oriented to receive another corner or perimeter portion or region of the circuit board 38 when the circuit board is attached to the carrier portion 12. The connector 34 may include additional pins or elements for engaging or inserting through the circuit board 38 when circuit board 38 is mounted to carrier portion 12, or the circuit board 38 may be electrically connected to the circuit board 32 (such as via a ribbon cable or the like), to electrically connect the circuit board 38 and associate circuitry and accessories to the external wire or cable or the like that is plugged into or otherwise connected to connector 34.

When accessory module 10 is mounted at the windshield, the face 22a of base portion 22 is generally at or opposed to the windshield. The face 22a preferably includes a seal or gasket 42 (FIGS. 1-3) around the recess 28 to substantially seal the face 22a against the windshield around the recess 28 and, thus, around the lens 20 attached to the lens mounting portion 26. Optionally, accessory mounting portion 24 of carrier portion 12 may include an opening or aperture 44 therethrough generally at the lens area and recess 28. The opening 44 may allow moisture to leave the lens area and enter into the housing area. The carrier portion 12 may include a filter or Gore-Tex patch (not shown) or the like (such as the type described in International Publication No. WO 2004/047421 A2, published on Jun. 3, 2004, which is hereby incorporated herein by reference) at the opening 44 to allow only water vapor to pass into the housing area. The opening 44 thus allows moisture to escape the lens area to avoid moisture that may enter the lens area or recess from condensing at the lens.

Figure 5:
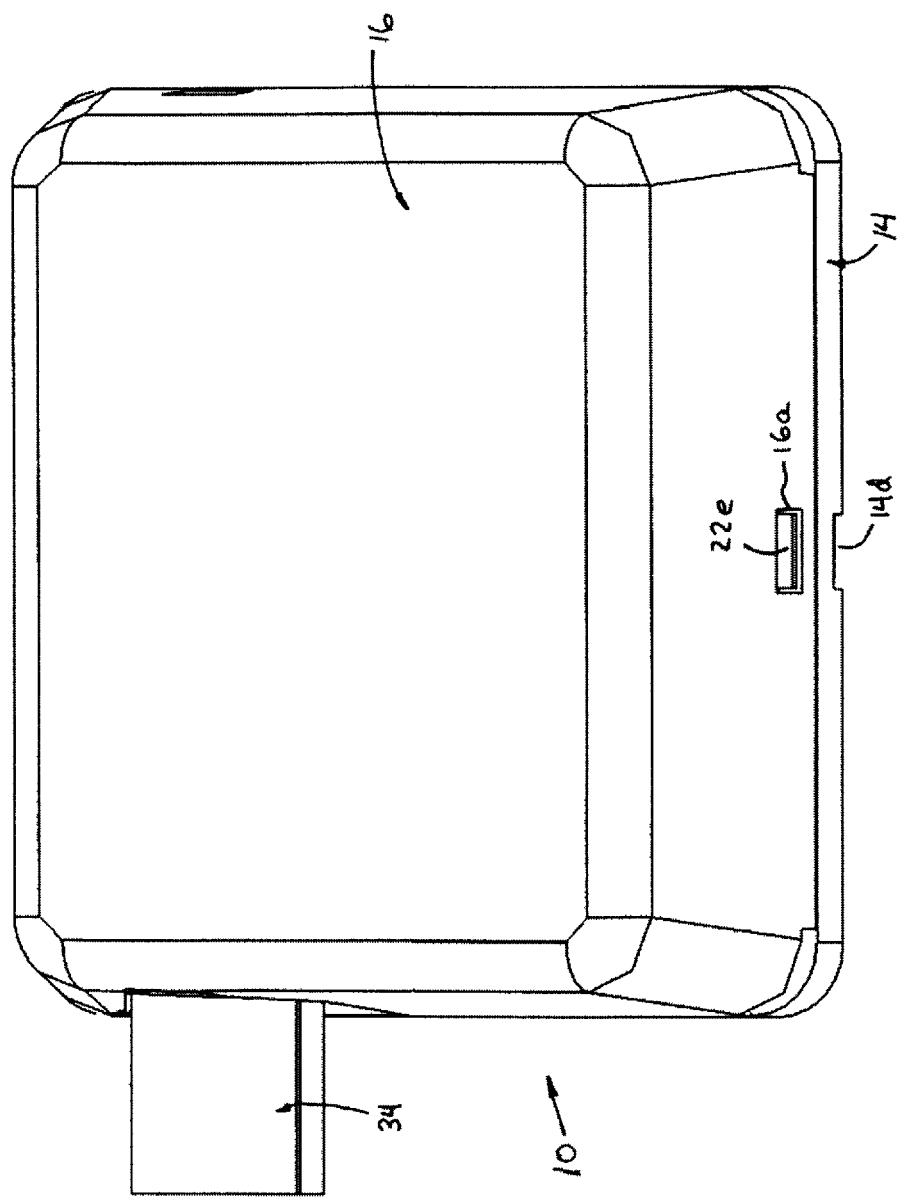
FIG. 5 is another perspective view of the accessory module of FIGS. 1-4.

The housing portion 16 may be configured to readily attach to or snap onto the carrier portion 12. For example, and as shown in FIGS. 1, 3 and 5, housing portion 16 may include slots or openings 16a for receiving clasps 22e of carrier portion 12 to detachably retain housing portion 16 to carrier portion 12. Housing portion 16 may also include an opening or slot 16b (FIGS. 1, 4 and 5) at one side for receiving connector 34 as housing portion 16 is mounted to carrier portion 12. Carrier portion 12 may include another clasp 22f (FIGS. 7 and 10) for engaging an edge portion of slot 16b of housing portion 16 to further retain housing portion 16 to carrier portion 12.

The present invention thus provides an accessory module with a unitary accessory holding portion or carrier portion that is configured to receive an accessory, such as an imaging sensor and lens, and associated circuitry, and is configured to electrically connect the circuitry to an external wire or power source or control or the like. The circuit board and imaging sensor may be readily attached to the carrier portion, and the lens may be readily mounted and properly positioned at the carrier portion, whereby the carrier portion, with the accessories and circuitry mounted thereon, may be readily attached to the mounting element at the windshield of the vehicle. The accessory module of the present invention thus may be readily assembled and readily mounted at the vehicle with the desired accessories and circuitry for the particular application of the accessory module.

Because the imaging sensor and circuit board may be provided as a unit and readily attached to the carrier or holding portion of the accessory module, the circuit board manufacturer and/or supplier need not provide the lens as well. The lens then may be provided by a lens manufacturer or supplier, whereby the lens and circuit board/imaging sensor may be received by the accessory module manufacturer or by the vehicle assembler and assembled together. For example, the carrier portion of the accessory module may be provided at a vehicle assembly plant and different imaging arrays or sensors and/or other accessories or circuit board assemblies may be attached or mounted to the carrier portions depending on the particular application or desired content of the accessory module (such as what types of accessories are provided within or associated with the accessory module). The appropriate lens may be readily attached to the lens mounting portion, whereby the imaging sensor or chip is readily positioned at the appropriate location and orientation relative to the lens, without requiring adjustment of the chip location. Optionally, the lens may be adjusted (such as via threaded adjustment or the like) to adjust the focus of the lens relative to the imaging sensor, without affecting the scope of the present invention. The carrier portion may be provided for a particular vehicle or vehicle line or windshield angle, so that the lens is properly aligned or oriented with respect to the windshield and vehicle when the accessory module is mounted at the vehicle, in order to define the desired or appropriate viewing direction or field of view of the lens and imaging sensor. The accessory module thus may be provided as a family of modules, with different carrier portions with different angles between the lens mounting portion and the base portion being provided for different vehicles and/or windshield angles, while the same circuit boards and imaging sensors may be provided across different vehicle lines, depending on the desired content and particular application of the accessory module.

Optionally, the accessory module may include other accessories, such as one or more electrical or electronic devices or accessories, such as antennas, including global positioning system (GPS) or cellular phone antennas, such as the type disclosed in U.S. Pat. No. 5,971,552, a communication module, such as the type disclosed in U.S. Pat. No. 5,798,688, a voice recorder, a digital network, such as the type described in U.S. Pat. No. 5,798,575, transmitters and/or receivers, such as a garage door opener or the like, such as the types described in U.S. patent applications, Ser. No. 10/770,736, filed Feb. 3, 2004 by Baumgardner et al. for GARAGE DOOR OPENING SYSTEM FOR VEHICLE, now U.S. Pat. No. 7,023,322, and/or U.S. Pat. Nos. 6,396,408; 6,362,771; and 5,798,688 (and the accessory module may provide a storage compartment, such as for storing a hand held garage door opening device or transmitting device or the like), a digital network, such as the type described in U.S. Pat. No. 5,798,575, a memory mirror system, such as the type disclosed in U.S. Pat. No. 5,796,176, a hands-free phone attachment, a video device for internal cabin surveillance and/or video telephone function, such as the types disclosed in U.S. Pat. Nos. 5,760,962 and/or 5,877,897, a remote keyless entry receiver, a video mirror system, such as the types disclosed in commonly assigned U.S. Pat. Nos. 6,690,268; 6,428,172 and 6,420,975, and U.S. patent applications, Ser. No. 09/585,379, filed Jun. 1, 2000 for REARVIEW MIRROR ASSEMBLY WITH UTILITY FUNCTIONS; and Ser. No. 10/307,929, filed Dec. 2, 2002 by Hutzel et al. for AN INTERIOR REARVIEW MIRROR SYSTEM INCLUDING A PENDENT ACCESSORY, now U.S. Pat. No. 6,902,284, lights, such as map reading lights or one or more other lights or illumination sources, such as the types disclosed in U.S. Pat. Nos. 5,938,321; 5,813,745; 5,820,245; 5,673,994; 5,649,756; 5,178,448; 5,671,996; 4,646,210; 4,733,336; 4,807,096; 6,690,268; 6,042,253; and/or 5,669,698, and/or U.S. patent application, Ser. No. 10/054,633, filed Jan. 22, 2002 by Lynam et al. for VEHICULAR LIGHTING SYSTEM, now U.S. Pat. No. 7,195,381, microphones, such as the types disclosed in U.S. Pat. Nos. 6,243,003; 6,278,377; and/or 6,420,975, and/or PCT Application No. PCT/US03/30877, filed Oct. 1, 2003, published Apr. 15, 2004 as International Publication No. WO 2004/032568 A1, speakers, a compass or compass system (which may include the compass sensing circuitry), such as the types disclosed in U.S. Pat. Nos. 5,924,212; 4,862,594; 4,937,945; 5,131,154; 5,255,442; and/or 5,632,092, and/or U.S. patent application, Ser. No. 10/456,599, filed Jun. 6, 2003 by Weller et al. for INTERIOR REARVIEW MIRROR SYSTEM WITH COMPASS, now U.S. Pat. No. 7,004,593, a navigation system, such as the types described in U.S. Pat. Nos. 6,678,614 and 6,477,464, and U.S. patent applications, Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978, a tire pressure monitoring system, such as the types disclosed in U.S. Pat. Nos. 6,294,989; 6,445,287; and/or 6,472,979, a seat occupancy detector, a trip computer, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions), a telematics system, such as an ONSTAR® system or the like, and/or any other desired accessory or system or the like (with all of the above-referenced patents and patent applications and PCT applications being commonly assigned to Donnelly Corporation, and with the disclosures of all of the above referenced patents and patent applications and PCT applications being hereby incorporated herein by reference in their entireties.

The accessory or accessories may be positioned at or within the housing and may be included on or integrated in the printed circuit board or boards. The housing and accessory module may include user inputs or buttons or switches that are accessible by a driver or occupant of the vehicle to control one or more of the accessories of the accessory module and/or of the vehicle. The user actuatable inputs may comprise buttons or switches or touch sensors or proximity sensors or the like. The connection or link between the controls and the other systems and accessories of the accessory module and/or of the vehicle may be provided via vehicle electronic or communication systems and the like, and may be connected via various protocols or nodes or wired or wireless communication systems, such as BLUETOOTH®, SCP, UBP, J1850, CAN J2284, Fire Wire 1394, MOST, LIN and/or the like, or other vehicle-based or in-vehicle communication links or systems (such as WIFI and/or IRDA) and/or the like, depending on the particular application of the accessory module or system and the vehicle. Optionally, the connections or links may be provided via wireless connectivity or links, without affecting the scope of the present invention.

Optionally, the accessory module may include a display element, such as a video display element or the like, that may be viewable by a driver or occupant of the vehicle, such as to view vehicle information or captured images, such as images captured by an imaging system of the vehicle. For example, the display element may slide out or flip up or down from the housing portion to provide a video screen that is viewable by the driver of the vehicle, such as a video display screen of the type described in PCT Application No. PCT/US03/40611, filed Dec. 19, 2003 by Donnelly Corporation for ACCESSORY SYSTEM FOR VEHICLE, published Jul. 15, 2004 as International Publication No. WO 2004/058540 A2, which is hereby incorporated herein by reference. The video display screen may be operable to display information to the driver of the vehicle, and may be incorporated into or may be in communication with a vision system or imaging system of the vehicle, such as a rearwardly directed vehicle vision system utilizing principles disclosed in U.S. Pat. Nos. 5,550,677; 5,760,962; 5,670,935; 6,201,642; 6,717,610; and/or 6,757,109, which are hereby incorporated herein by reference, a trailer hitching aid or tow check system, such as the type disclosed in U.S. patent application, Ser. No. 10/418,486, filed Apr. 18, 2003 by McMahon et al. for VEHICLE IMAGING SYSTEM, now U.S. Pat. No. 7,005,974, which is hereby incorporated herein by reference, a cabin viewing device or system, such as a baby viewing or rear seat viewing camera or device or system or the like, such as disclosed in U.S. Pat. Nos. 5,877,897 and 6,690,268, which are hereby incorporated herein by reference, a video communication device or system, such as disclosed in U.S. Pat. No. 6,690,268, which is hereby incorporated herein by reference, and/or the like. Optionally, the video display screen may also or otherwise serve as a screen for a navigation system of the vehicle or the like, such as a GPS-based navigation system, such as is known in the automotive art.

Optionally, the accessory module may include or may be associated with a telematics system of the vehicle, such as an ONSTAR® system as found in General Motors vehicles or the like, and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; and/or 6,678,614; and/or U.S. patent applications, Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGA- TION SYSTEM FOR USE WITH A TELEMATICS SYSTEM, now U.S. Pat. No. 7,167,796; and Ser. No. 10/422,378, filed Apr. 24, 2003 by Schofield for IMAGING SYSTEM FOR VEHICLE, now U.S. Pat. No. 6,946,978; and/or PCT Application No. PCT/US03/40611, filed Dec. 19, 2003 by Donnelly Corporation et al. for ACCESSORY SYSTEM FOR VEHICLE, and/or PCT Application No. PCT/US03/30877, filed Oct. 1, 2003 by Donnelly Corp. for MICROPHONE SYSTEM FOR VEHICLE, published Apr. 15, 2004 as International Publication No. WO 2004/032568 A1, which are all hereby incorporated herein by reference.

Optionally, the accessory module may be positioned at or near an interior rearview mirror assembly of the vehicle, and/or one or more of the accessories or circuitry of the accessory module may be associated with one or more accessories or controls of the interior rearview mirror assembly. For example, the accessory module may be positioned at or near a prismatic mirror assembly, such as a prismatic mirror assembly utilizing aspects described in U.S. Pat. Nos. 6,318,870; 5,327,288; 4,948,242; 4,826,289; 4,436,371; and 4,435,042, and PCT Application No. PCT/US2004/015424, filed May 18, 2004 by Donnelly Corporation et al. for MIRROR ASSEMBLY FOR VEHICLE, published Dec. 2, 2004 as International Publication No. WO 2004/103772, which are hereby incorporated herein by reference. Optionally, the prismatic reflective element may comprise a conventional prismatic reflective element or prism or may comprise a prismatic reflective element of the types described in PCT Application No. PCT/US03/29776, filed Sep. 19, 2003 by Donnelly Corp. et al. for MIRROR REFLECTIVE ELEMENT ASSEMBLY, published Apr. 1, 2004 as International Publication No. WO 2004/026633 A2; U.S. patent applications, Ser. No. 10/709,434, filed May 5, 2004 by Lynam for MIRROR REFLECTIVE ELEMENT, now U.S. Pat. No. 7,420,756, and Ser. No. 10/993,302, filed Nov. 19, 2004 by Lynam for MIRROR REFLECTIVE ELEMENT FOR A VEHICLE, now U.S. Pat. No. 7,338,177; and U.S. provisional application, Ser. No. 60/525,952, filed Nov. 26, 2003 by Lynam for MIRROR REFLECTIVE ELEMENT FOR A VEHICLE, which are all hereby incorporated herein by reference, without affecting the scope of the present invention.

Alternately, for example, the interior rearview mirror assembly may comprise an electro-optic or electrochromic mirror assembly, which may utilize some of the principles described in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as described in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein; and/or as described in U.S. patent application, Ser. No. 10/054,633, filed Jan. 22, 2002 by Lynam et al. for VEHICULAR LIGHTING SYSTEM, now U.S. Pat. No. 7,195,381, which is hereby incorporated herein by reference. The mirror assembly may include one or more displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 6,690,268; 5,668,663 and/or 5,724,187, and/or in U.S. patent application, Ser. No. 10/054,633, filed Jan. 22, 2002 by Lynam et al. for VEHICULAR LIGHTING SYSTEM, now U.S. Pat. No. 7,195,381; PCT Application No. PCT/US03/29776, filed Sep. 9, 2003 by Donnelly Corp. et al. for MIRROR REFLECTIVE ELEMENT ASSEMBLY; and/or PCT Application No. PCT/US03/40611, filed Dec, 19, 2003 by Donnelly Corp. et al. for ACCESSORY SYSTEM FOR VEHICLE, which are all hereby incorporated herein by reference.

The interior rearview mirror assembly may be mounted at the accessory module, such as via a button-on-button mounting arrangement or the like, or the accessory module may constitute a base or mounting portion of the mirror assembly, or the accessory module and mirror assembly may be otherwise attached to or connected to or associated with one another, without affecting the scope of the present invention.

Figure 11:
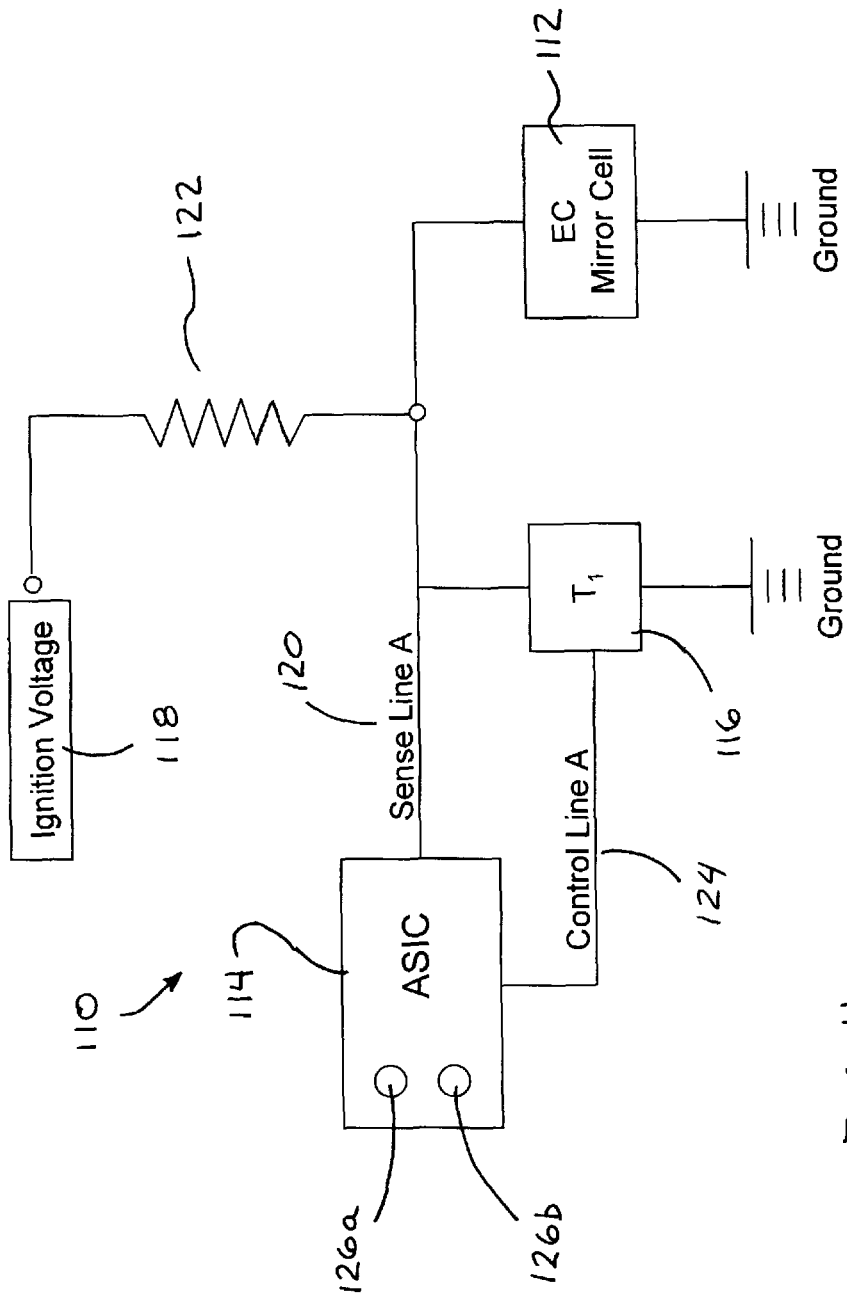
FIG. 11 is a block diagram of a mirror control system in accordance with the present invention.

Optionally, the accessory module and/or mirror assembly may include a control system for controlling the dimming of the electro-optic mirror reflective element or cell, such as for controlling an electrochromic mirror reflective element or cell, such as a control system of the types described in U.S. Pat. Nos. 6,406,152; 6,305,807; 6,291,905; 6,089,721; 6,056,410; and/or 6,210,008, which are hereby incorporated herein by reference. The control system may be included or incorporated in the mirror casing of the mirror assembly (or in any other part of the mirror assembly, such as a mounting portion or a pod portion or the like), and may include or, and preferably, may be substantially established on an application specific integrated chip (ASIC), such as an ASIC positioned at or to the rear of the mirror reflective element of the interior mirror assembly. The EC driver circuit is operable to control the electro-optic or electrochromic (EC) mirror reflective element or cell (by adjusting or controlling the voltage applied to the powering electrode at the conductive coatings of the mirror reflective element or cell) in response to an ignition voltage and a current gating element or transistor. For example, and as shown in FIG. 11, an interior electro-optic mirror control system 110 for controlling an interior electro-optic or electrochromic mirror reflective element or cell 112 includes control circuitry or a microprocessor or the like on a circuit board or controller 114 (such as an EC-driver-circuit-on-a-chip, such as established at or on an ASIC or "chip") and a current gating element 116.

The control system 110 and mirror reflective element is preferably powered by an ignition voltage 118 of the vehicle (or other power source), which preferably is directly connected via a resistor 122 to a powering electrode of the EC cell to power the EC cell 112 (with the other side or electrode of the EC cell being grounded or connected to ground). A voltage sensing line 120 is connected between the powering electrode of the EC cell 112 and the ASIC controller 114, whereby the ASIC controller can determine/measure the voltage being applied at any moment in time to the EC cell. The ASIC controller thus can sense or monitor the voltage and control the voltage applied across the EC cell (via control of the current flow through current gating element 116) so that it does not exceed its tolerable design intent (typically between 0 to 1.4 volts DC or thereabouts). Current flowing through current gating element 116 is controlled by ASIC controller 114 via control line 124. As illustrated, the current gating element 116 and the EC cell 112 are grounded or connected to or in conductive communication with ground. Note that this is a preferred embodiment, but other embodiments are contemplated utilizing further electronic or electrical circuitry or components.

When the ASIC controller 114 detects that the voltage (as sensed by sense line 120) being applied across the EC cell is higher than what is desired or can be tolerated by the electrochromic medium utilized in the EC cell, then ASIC controller 114 opens up current flow through current gating element 116 to maintain the desired applied tolerable voltage across the EC cell. Further, should it be desired to further reduce an applied voltage across the EC cell, then ASIC controller 114 may further open up or increase current flow through the current gating element 116 so that voltage across the EC cell is reduced. Thus, in order to bleach the cell (i.e. to apply zero or close to zero volts across the EC cell), the control line 124 essentially reduces the resistive path through the current gating element 116 close to or at about zero ohms. The ASIC controller thus detects the instantaneous voltage (as dropped from the vehicle ignition through resistor 122 and supplied to the powering electrode of the EC cell), and may adjust or control or open the gating element 116 to shunt a desired or appropriate amount of current through the gating element to ground, such that a reduced or desired or appropriate voltage is applied to the EC cell to maintain the voltage at the EC cell within the tolerable range and/or to achieve the desired degree of dimming of the electro-optic mirror reflective element or cell. Thus, the ASIC controller responds to detected glaring and ambient light levels about the vehicle to increase or decrease the resistance path through gating element 116 to increase or decrease the voltage across the EC cell, as needed or appropriate for the particular glaring or ambient lighting conditions encountered while driving at night, while always ensuring that the EC cell is not damaged or endangered by an over-voltage such as might occur should an ignition voltage or close to an ignition voltage be applied for more than a momentary period across the EC medium.

As illustrated, the ASIC controller includes photosensors 126a, 126b, such as photodiodes or phototransistors or the like, for sensing glare and ambient light at the mirror assembly. Optionally, one or more of the photosensors may be in communication with a light pipe for piping or conduiting ambient light or glare light from external to the mirror assembly to the photosensor or photosensors within the casing and at the ASIC controller. For example, the light pipe or pipes may utilize aspects of the light-piping described in U.S. patent application, Ser. No. 10/229,573, filed Aug. 28, 2002 by Blank for VEHICLE MIRROR SYSTEM WITH LIGHT CONDUITING MEMBER, and published Mar. 6, 2003 as Publication No. U.S. 2003/0043589, now U.S. Pat. No. 7,008,090, which is hereby incorporated herein by reference. Optionally, the light pipe connected to or in communication with the ambient light sensing photosensor may be routed generally downwardly from the photosensor to receive ambient light from a lower portion view port of the mirror casing of the mirror assembly (or could be routed upward to an upper portion view port of the minor casing). The circuitry or ASIC controller thus may determine the glare and ambient light present at the mirror assembly in response to the outputs of the photosensors and may adjust or control the current gating element so that the appropriate degree of dimming is achieved at the mirror reflective element or cell.

For example, when the ignition is initially activated and the current gating element is closed, the initial voltage (e.g. about 12 volts) is applied to the EC cell and detected by the ASIC controller via the sense line. The ASIC controller will then control the current gating element to shunt the appropriate amount of voltage/current through the current gating element to reduce the voltage at the mirror cell to a desired and tolerable voltage level (such as a voltage typically between zero volts and about 1.4 volts or thereabouts). If the ASIC controller detects or determines (such as in response to the outputs of the ambient light and glare photosensors) that the cell should be dimmed a greater or reduced amount (such as via a detection of reduced glare and/or increased ambient light), the ASIC controller adjusts or controls or opens/closes the current gating element (via the control line) to shunt a desired or appropriate amount of the current/voltage to ground so that an increased/reduced amount of current/voltage is applied to the mirror reflective element or cell, thereby dimming the cell an increased/reduced/desired amount.

The circuitry or circuit board or ASIC controller 114 may include various processing elements established on a chip, such as a microprocessor, memory, an A/D converter, a D/A converter, a LIN/CAN BUS, an EC cell voltage sensing/control, a dawn/dusk shutdown circuitry, timers, drivers, and/or the like. Optionally, the ASIC controller may include compass sensors and/or circuitry and/or the like, such as in a similar manner as a "compass-on-a-chip", such as described in U.S. patent application, Ser. No. 11/021,065, filed Dec. 23, 2004 by McCabe et al. for ELECTRO-OPTIC MIRROR CELL, now U.S. Pat. No. 7,255,451, which is hereby incorporated herein by reference. The ASIC controller may be positioned within the mirror casing, such as at and behind the mirror reflective element or cell. The current gating element or transistor 116 may be internal to or incorporated in the ASIC controller, or may be external to the ASIC controller, without affecting the scope of the present invention. Optionally, the control system or ASIC controller may have one, two or three current gating elements or transistors or the like (such as for control channels for only one mirror reflective element or for two or three mirror reflective elements, such as for an interior mirror reflective element and two outside or exterior mirror reflective elements), with any one or all of which may be internal or external to the ASIC controller, without affecting the scope of the present invention.

Control circuitry, and software and hardware to so do, are known in the art. For example, the likes of a UD13 Super Smart Power Mirror Motor Driver available from SGS-Thomson Microelectronics can be used. Such ASICs typically include a microprocessor, such as an eight bit or sixteen bit MCU, UART, memory, such as 8K ROM or more, memory, such as 256 bytes RAM, ADC, WPG, timers, A/D converters, D/A converters, display drivers, thermistors, LIN or CAN communication I/Os, other I/Os, high-side drivers and half-bridge drivers, all established on a silicon or similar semiconductor substrate. In the present invention, such can be adapted to form the EC-driver-on-a-chip by co-establishing on the semiconductor substrate two photosensitive areas, such as by forming photodiodes or phototransistors on the substrate. In addition to the light piping described above, lensing and/or infrared light filtering may be provided at the chip level in such an EC-driver-on-a-chip.

The ignition voltage 118 may be unregulated and may provide an output of about 9 volts to about 16 volts typical, and about 12.8 volts nominal. The resistor 122 may comprise any type of suitable resistor, and may provide a resistance of about 20 ohms to about 40 ohms or thereabouts, with about two to five watts of power dissipation or greater or lower depending on the particular EC interior mirror construction. For example, the resistor may comprise a copper or PTC trace on a flexible circuit or pad attached to the rear of the mirror reflective element or cell, or may comprise any other suitable resistor element, without affecting the scope of the present invention. Optionally, the interior rearview mirror element itself can function as a heat sink to the likes of a flat ribbon power dropping resistor attached thereto. The EC-driver-on-a-chip could be implemented for an independent exterior rearview mirror, such as by utilizing aspects described in U.S. Pat. No. 5,659,423, which is hereby incorporated herein by reference. Such use of large-scale integration of electronic functionality/circuitry in an EC-driver-on-a-chip can achieve a markedly lower package size at a reduced cost than has hitherto been known for EC driver circuitry, and can allow greater design and construction flexibility for the interior mirror assembly.

Figure 12:
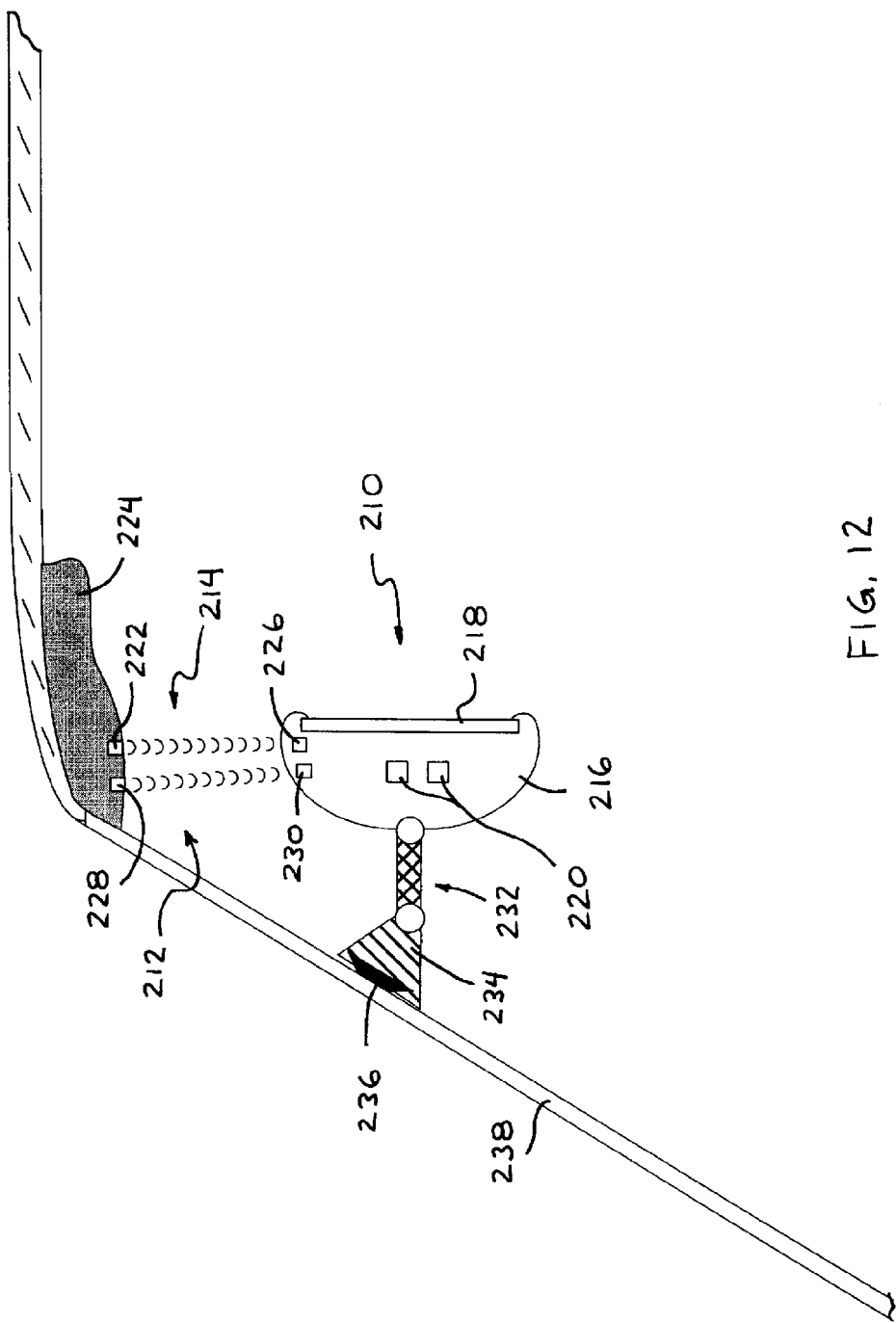
FIG. 12 is a side elevation of a mirror assembly in accordance with the present invention.

Optionally, and with reference to FIG. 12, an interior rearview mirror assembly 210 may be wirelessly powered and controlled via a remote or wireless communication link or system 212 and a remote or wireless power link or system 214. Mirror assembly 210 includes a mirror casing or housing 216 and a reflective element 218. Mirror assembly 210 also includes one or more electrically powered accessories 220, such as power consuming accessories within the mirror casing 216, such as at or established on a printed circuit board or ASIC controller or the like within the mirror assembly. Because the mirror accessories are powered and controlled by wireless systems, the mirror assembly may include power consuming accessories without the additional requirement of wires and/or cables extending between the mirror assembly and the headliner of the vehicle.

The wireless power link or system 214 includes a remotely located inductive power transmitter 222, such as positioned in or at the headliner 224 of the vehicle, and an inductive power receiver or transceiver 226, such as positioned at or in the mirror casing 216 of mirror assembly 210. Note that the transmitter can be located elsewhere in the vehicle, such as within an instrument panel region, or in a side door/side panel portion when inductively coupling to an exterior mirror assembly or an exterior door handle assembly. The inductive power transmitter 222 comprises a power coil located in the headliner of the vehicle (and connected to a power source of the vehicle, such as via wires or cables), while the inductive power receiver 226 comprises a receiver coil in or at the mirror assembly for receiving the inductive power generated by the power coil. The remote power system thus provides inductive power coupling to the mirror assembly from a location remote from the mirror assembly, without wires or cables connected between the remote location and mirror assembly. The inductive power system of the present invention may utilize aspects of the inductive powered devices described in U.S. Pat. Nos. 6,917,163; 6,825,620; 6,812,645; 6,731,071; and 5,264,997, which are hereby incorporated herein by reference. The frequencies and protocols and means used for operation of the inductive power link or system may be selected to reduce or minimize adverse effects the inductive power coupling may have on the wireless communication system and on the performance of the accessories at or in or near the mirror assembly or elsewhere in the vehicle, and can be chosen to minimize/eliminate any EMI/RFI impact on vehicle electricals.

As can be seen in FIG. 12, power to electrify/operate any electrical/electronic components or accessories of the mirror assembly (such as for example, a map or a reading lamp or an electrochromic mirror reflective element or a garage door opener or a compass circuit or a camera or a headlamp controller or a heater pad or a motor or the like) is provided by inductive coupling rather than by wired connection. The secondary (receiving) element (typically a coil) of the inductively powered link is preferably placed such as in the mirror housing or elsewhere in the mirror assembly (or in a windshield accessory module), and in proximity (typically a few inches up to about ten inches or so) to and adjacent to but separated from and remote from the primary (transmitting) element (that also typically is a coil) of the inductive coupling system that is connected to the vehicle battery/ignition power supply in order to supply power to the inductively powered mirror or accessory module assembly via a wireless link. The elimination of electrical connectors may enhance the reliability of the system by eliminating the costs and complexities associated with conventional electrical connectors. For example, conventional electrical connectors, even when LIN-BUS enabled, can be large/costly and require the vehicle assembly-line employee to make a plug-socket connection when the vehicle is being assembled. By contrast, all power (often several watts of power; for example, about 0.25 watts to about 20 watts or more depending on whether a heater pad may be being used) required to operate the mirror according to the present invention can be inductively passed from the power source of the vehicle to the inductively powered mirror assembly, and the driver experiences a "surprise and delight" appreciation given that no wiring is visible to the driver. Also, in accordance with the present invention, the vehicle manufacturer can choose to add or delete accessories from a mirror assembly or accessory module assembly without concern about pre-providing enough wires/connector for I/O and for power.

The wireless communication link or system 212 includes a data transceiver 228, such as located at or in the headliner, and a data transceiver 230, such as at or in the mirror assembly. The wireless communication system thus provides for wireless communication between the data transceiver 228 and the data transceiver 230 to communicate with and/or control the accessories 220 of the mirror assembly. Note that a broadband or multi-channel wireless communication link can be established allowing multiple inputs and outputs to the mirror assembly and control of and data I/O to and from a plurality of controls and devices within and at the interior mirror assembly. The wireless communication link or data channel may comprise various wireless links or protocols, such as an infrared communication link (such as described in U.S. patent application, Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference) or radio frequency communication, or other communication protocol, such as BLUETOOTH® or the like.

In the illustrated embodiment, the mirror assembly 210 includes a double ball mounting arrangement 232 (although other mounting arrangements, such as single ball mounting arrangements or the like may be implemented without affecting the scope of the present invention), which pivotally mounts the mirror casing 216 and reflective element 218 to a mounting base or channel mount 234, which, in turn, is attached to a mounting button or attachment element 236 at the interior surface of the windshield 238 of the vehicle. The mirror assembly and mounting base thus may be mounted to the windshield at a location spaced downward from the headliner of the vehicle, without requiring any wires or cables or wire covers or the like along the windshield and between the mounting base and the headliner. The reflective element of the mirror assembly may comprise an electro-optic reflective element (such as an electrochromic reflective element) or a prismatic reflective element, without affecting the scope of the present invention.

Although shown and described as having the power receiver located in or at the mirror assembly, clearly, the power receiver may be located elsewhere, such as within the mirror casing, or at or in or near a pod or module or windshield electronics module (WEM) or at or in an exterior mirror or the like, without affecting the scope of the present invention. The remote or wireless power system thus provides power to the power receiver and to the accessories at or near or connected to or associated with the power receiver to power the accessories, while the wireless communication system provides communication and/or control to and from the accessories at or near or connected to or associated with the power receiver to control or activate/deactivate or monitor the accessories.

Because the mirror assembly 210 and accessories therein or thereat is/are powered by a remote power system or source, the mirror system does not require or include a wire harness and connector and wire cover or the like that is typically positioned along the windshield of the vehicle and between the mirror mount and the headliner of the vehicle. Also, because no such wires and wire covers are located along the windshield, the desire or need of a frit layer or the like at the windshield to conceal such wires/wire covers is obviated.

Optionally, the interior mirror assemblies and/or accessory modules of the present invention may include a hard disc drive (HDD) electronic mass storage device, and preferably a HDD microdrive, such as a one-inch (or smaller) HDD, such as are developed by Hitachi Global Storage Technologies, Inc. (HGST) of the United States, Hoya Corp. of Japan, and Seagate Technology LLC.

Optionally, the accessory module may be at or near or associated with another accessory module or windshield electronics module or console or other types of modules or housings, such as the types described in U.S. patent applications, Ser. No. 10/355,454, filed Jan. 31, 2003 by Schofield et al. for VEHICLE ACCESSORY MODULE, now U.S. Pat. No. 6,824,281; and Ser. No. 10/456,599, filed Jun. 6, 2003 by Weller et al. for INTERIOR REARVIEW MIRROR SYSTEM WITH COMPASS, now U.S. Pat. No. 7,004,593, and/or U.S. Pat. Nos. 6,690,268; 6,250,148; 6,341,523; 6,593,565; 6,229,226; and 6,326,613, and/or PCT Application No. PCT/US03/40611, filed Dec. 19, 2003 by Donnelly Corp. et al. for ACCESSORY SYSTEM FOR VEHICLE, which are all hereby incorporated herein by reference. Optionally, the accessory module and/or mirror assembly may utilize aspects of the modules and mirror assemblies described in U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference in their entireties.

Therefore, the present invention provides an accessory module that may include an imaging sensor or device and may include other accessories as well. The accessory module includes a unitarily molded support or carrier portion that readily receives the accessory and circuitry to ease assembly of the accessory module. The assembled carrier portion, with the accessory or accessories and associated circuitry mounted thereon, may be readily attached to a mounting element or button at the windshield of the vehicle. When so attached, the imaging sensor and lens are oriented at the desired angle to provide the desired or appropriate field of view through the windshield of the vehicle. Because the carrier portion of the accessory module is unitarily formed, there are fewer components, which eases the assembly of the accessory module and deproliferates parts in the assembly plant.

Changes and modifications to the specifically described embodiments may be carried out without departing from the principles of the present invention, which is intended to be limited only by the scope of the appended claims as interpreted according to the principles of patent law.

The embodiments of the invention in which an exclusive property is claimed are defined as follows:

1. An accessory system for a vehicle, said accessory system comprising:
a windshield, said windshield having an outer surface that is exterior of the vehicle when said windshield is mounted to a vehicle equipped with said accessory system and an inner surface that is interior of the vehicle when said windshield is mounted to the equipped vehicle;
wherein said windshield is at an angle relative to vertical when said windshield is mounted to the equipped vehicle;
wherein said windshield has a mounting element adhesively attached at said inner surface;
an accessory support adapted for mounting to and demounting from said mounting element, said accessory support including an accessory receiving portion configured to receive an accessory;
wherein at least one of (a) said accessory support comprises part of an interior rearview mirror assembly, (b) said accessory support includes a mirror mounting element and an interior rearview mirror assembly is adapted for mounting to said mirror mounting element of said accessory support and (c) said accessory support comprises an electrical connector; and
wherein said accessory comprises an imaging sensor comprising a lens and a CMOS photosensor array and wherein said accessory receiving portion is configured to accommodate said imaging sensor in a manner that compensates for said angle of said windshield so that said imaging sensor has a more generally horizontal forward field of view through said windshield when said accessory support is mounted to said mounting element adhesively attached at said inner surface of said windshield.

2. The accessory system of claim 1 further comprising a removable cover that substantially encompasses said accessory, associated circuitry and said accessory support, and wherein at least one of (a) said removable cover is adapted for removable attachment at said accessory support and (b) said removable cover is adapted for removable attachment at said accessory support via a snap connection.

3. The accessory system of claim 1, wherein said accessory support comprises part of an interior rearview mirror assembly.

4. The accessory system of claim 3, wherein said mounting element comprises a minor mounting button.

5. The accessory system of claim 4, wherein a base portion of said interior rearview minor assembly comprises said accessory support.

6. The accessory system of claim 4, wherein a mirror casing comprising a mirror reflective element of said interior rearview minor assembly is pivotally mounted at said accessory support via a single pivot mounting arrangement for adjustably mounting said minor casing at said mounting element.

7. The accessory system of claim 4, wherein a mirror casing comprising a mirror reflective element of said interior rearview minor assembly is pivotally mounted at said accessory support via a double pivot mounting arrangement for adjustably mounting said minor casing at said mounting element.

8. The accessory system of claim 1, wherein said accessory support includes a mirror mounting element and wherein an interior rearview mirror assembly is adapted for mounting to said mirror mounting element of said accessory support.

9. The accessory system of claim 1, wherein said accessory support comprises an electrical connector and wherein said accessory support comprises a circuitry receiving portion configured to receive a printed circuit board at said accessory support, said electrical connector for electrically connecting said printed circuit board to an electrical source of the vehicle.

10. The accessory system of claim 9, wherein said base portion, said accessory receiving portion and said circuitry receiving portion are integrally molded together so that said accessory support comprises a unitarily molded accessory support.

11. The accessory system of claim 10, wherein said electrical connector comprises a plurality of conducting members insert molded within a connecting portion of said accessory support.

12. The accessory system of claim 1, wherein said accessory receiving portion includes a recessed portion for receiving said imaging sensor.

13. The accessory system of claim 1, wherein said accessory receiving portion comprises a photosensor array receiving portion configured to receive said photosensor array therein, and wherein said accessory support includes a lens receiving portion configured to receive said lens, and wherein said lens receiving portion and said photosensor array receiving portion are arranged so that said photosensor array received in said photosensor array receiving portion is generally perpendicular to a longitudinal axis of said lens received in said lens receiving portion.

14. The accessory system of claim 1, wherein said accessory system comprises an interior rearview mirror assembly and wherein said interior rearview mirror assembly includes an electro-optic reflective element, and wherein at least two photosensors, a microprocessor and associated circuitry are all commonly established on a common semiconductor element, and wherein said microprocessor is operable to detect a voltage applied to said electro-optic reflective element and to adjust the voltage applied to said electro-optic reflective element via controlling a current gating element, said current gating element controlling an amount of current shunted to ground to control the voltage applied to said electro-optic reflective element.

15. The accessory system of claim 1, wherein at least one of an interior rearview mirror assembly and said accessory support includes an inductive power receiver that receives power from an inductive power transmitter located remotely from said at least one of said interior rearview mirror assembly and said accessory support, and wherein said at least one of said interior rearview mirror assembly and said accessory support includes a data transceiver that wirelessly communicates with a data transceiver located remotely from said at least one of said interior rearview mirror assembly and said accessory support.

16. The accessory system of claim 1, wherein at least one of (a) an interior rearview mirror assembly houses an illumination source, and wherein said illumination source comprises at least one high-intensity power light emitting diode, and wherein said high-intensity power light emitting diode emits with a luminous efficiency of at least about 7 lumens per watt and passes a forward current of at least about 350 milliamps when operated at its operating voltage, and wherein said high-intensity power light emitting diode emits white light with a luminous flux of at least about 25 lumens when operated at its operating voltage, (b) an interior rearview mirror assembly houses a video display operable to display information for viewing by the driver through a reflective element of said interior rearview mirror assembly, (c) an interior rearview mirror assembly houses a video display operable to display information for viewing by the driver through an electrochromic reflective element of said interior rearview mirror assembly, and said accessory system further comprises control circuitry that at least one of (i) increases the intensity of light emitted by said video display when ambient light is high and decreases the intensity of light emitted by said video display when ambient light is low, and (ii) increases the intensity of light emitted by said video display to compensate for loss of transmission through said electrochromic reflective element when said electrochromic medium dims responsive to a voltage applied thereto, and wherein said control circuitry comprises at least one of (i) electronic components that commonly control dimming of said electrochromic medium and actuation of said video display and (ii) sub-circuitry that commonly controls dimming of said electrochromic medium and actuation of said video display, and (d) an interior rearview mirror assembly houses a video display operable to display information for viewing by the driver through a reflective element of said interior rearview mirror assembly, and wherein said video display comprises a back lit liquid crystal display element and wherein said liquid crystal display element is back lit by a plurality of white light emitting light emitting diodes, and wherein step-by-step driving instructions are displayed by said video display.

17. An accessory system for a vehicle, said accessory system comprising:
a windshield, said windshield having an outer surface that is exterior of the vehicle when said windshield is mounted to a vehicle equipped with said accessory system and an inner surface that is interior of the vehicle when said windshield is mounted to the equipped vehicle;
wherein said windshield is at an angle relative to vertical when said windshield is mounted to the equipped vehicle;
a mirror mounting button adhesively attached at said inner surface of said windshield at a first location;
an interior rearview mirror assembly mounted to said mirror mounting button;
wherein said windshield has a mounting element adhesively attached at said inner surface at a second location;
an accessory support adapted for mounting to and demounting from said mounting element; and
wherein said accessory support comprises a first holding portion configured to hold a CMOS photosensor array, and wherein said accessory support comprises a second holding portion configured to hold a lens, and wherein said CMOS photosensor array held at said first holding portion is generally perpendicular to the longitudinal axis of the lens held at said second holding portion.

18. The accessory system of claim 17, wherein a circuit board held at said first holding portion comprises said CMOS photosensor array.

19. The accessory system of claim 17, wherein said accessory support comprises a removable cover.

20. The accessory system of claim 17, wherein said accessory support comprises a base portion having a first side and an opposing rear surface, and wherein when said accessory support is mounted to said mounting element attached at said windshield, said first side of said base portion faces towards said windshield and said second side of said base portion faces away from said windshield.

21. The accessory system of claim 20, wherein an electrical connector is disposed at said second side of said base portion and wherein said electrical connector is configured for electrical connection to at least one of (i) an electrical source of the equipped vehicle, (ii) a power source of the equipped vehicle and (iii) a control of the equipped vehicle.

22. The accessory system of claim 21, wherein said electrical connector comprises a plurality of conducting members.

23. The accessory system of claim 20, wherein said holding portion is disposed at said second side of said base portion and wherein said holding portion is integral with said base portion.

24. An accessory system for a vehicle, said accessory system comprising:
a windshield, said windshield having an outer surface that is exterior of the vehicle when said windshield is mounted to a vehicle equipped with said accessory system and an inner surface that is interior of the vehicle when said windshield is mounted to the equipped vehicle;
wherein said windshield is at an angle relative to vertical when said windshield is mounted to the equipped vehicle;
a mirror mounting button adhesively attached at said inner surface of said windshield at a first location;
an interior rearview mirror assembly mounted to said mirror mounting button;
wherein said windshield has a mounting element adhesively attached at said inner surface at a second location;
an accessory support adapted for mounting to and demounting from said mounting element;
wherein said accessory support accommodates a lens, a CMOS photosensor array and a circuit board;
wherein said accessory support is configured so that when mounted to said mounting element attached at said windshield, said lens is at an angle with respect to said windshield that provides a field of view for said lens through said windshield appropriate for a driver assistance system of the equipped vehicle; and
wherein said driver assistance system comprises at least one of (i) an automatic headlamp control system of the equipped vehicle, (ii) a lane departure warning system of the equipped vehicle, (iii) an object detection system of the equipped vehicle, (iv) a traffic sign recognition system of the equipped vehicle, (v) a precipitation sensing system of the equipped vehicle and (vi) a collision avoidance system of the equipped vehicle.

25. The accessory system of claim 24, wherein said accessory support comprises a holding portion configured to hold said lens.

26. The accessory system of claim 24, wherein said lens has a generally horizontal forward field of view through said windshield when said accessory support is mounted to said mounting element attached at said windshield.

27. The accessory system of claim 24, wherein, when mounted to said mounting element attached at said windshield, said accessory support is positioned behind an area of said windshield that is wiped by a windshield wiper of the equipped vehicle when said windshield wiper is activated.

28. The accessory system of claim 24, wherein said accessory support comprises an electrical connector and wherein said electrical connector is configured for electrical connection to at least one of (i) an electrical source of the equipped vehicle, (ii) a power source of the equipped vehicle and (iii) a control of the equipped vehicle.

29. The accessory system of claim 28, wherein said electrical connector comprises a plurality of conducting members.

30. The accessory system of claim 24, wherein said CMOS photosensor array is disposed in said accessory support generally perpendicular to the longitudinal axis of said lens.

31. The accessory system of claim 24, wherein said circuit board comprises said CMOS photosensor array.

32. The accessory system of claim 31, wherein said lens is separate from said circuit board and said CMOS photosensor array.

33. An accessory system for a vehicle, said accessory system comprising:
a windshield, said windshield having an outer surface that is exterior of the vehicle when said windshield is mounted to a vehicle equipped with said accessory system and an inner surface that is interior of the vehicle when said windshield is mounted to the equipped vehicle;
wherein said windshield is at an angle relative to vertical when said windshield is mounted to the equipped vehicle;
a mirror mounting button adhesively attached at said inner surface of said windshield at a first location;
an interior rearview mirror assembly mounted to said mirror mounting button;
wherein said windshield has a mounting element adhesively attached at said inner surface at a second location;
an accessory support adapted for mounting to and demounting from said mounting element;
wherein said accessory support accommodates a lens, a CMOS photosensor array and a circuit board;
wherein said accessory support is configured so that when mounted to said mounting element attached at said windshield, said lens has a field of view through said windshield appropriate for a driver assistance system of the equipped vehicle;
wherein said driver assistance system comprises at least one of (i) an automatic headlamp control system of the equipped vehicle, (ii) a lane departure warning system of the equipped vehicle, (iii) an object detection system of the equipped vehicle, (iv) a traffic sign recognition system of the equipped vehicle, (v) a precipitation sensing system of the equipped vehicle and (vi) a collision avoidance system of the equipped vehicle;
wherein, when mounted to said mounting element attached at said windshield, said accessory support is positioned behind an area of said windshield that is wiped by a windshield wiper of the equipped vehicle when said windshield wiper is activated; and
wherein said accessory support comprises an electrical connector and wherein said electrical connector is configured for electrical connection to at least one of (i) an electrical source of the equipped vehicle, (ii) a power source of the equipped vehicle and (iii) a control of the equipped vehicle.

34. The accessory system of claim 33, wherein said CMOS photosensor array is held in said accessory support generally perpendicular to the longitudinal axis of said lens.

35. The accessory system of claim 34, wherein said circuit board comprises said CMOS photosensor array.

36. An accessory system for a vehicle, said accessory system comprising:
a windshield, said windshield having an outer surface that is exterior of the vehicle when said windshield is mounted to a vehicle equipped with said accessory system and an inner surface that is interior of the vehicle when said windshield is mounted to the equipped vehicle;

wherein said windshield is at an angle relative to vertical when said windshield is mounted to the equipped vehicle;

a mirror mounting button adhesively attached at said inner surface of said windshield at a first location;

an interior rearview mirror assembly mounted to said mirror mounting button;

wherein said windshield has a mounting element adhesively attached at said inner surface at a second location;

an accessory support adapted for mounting to and demounting from said mounting element;

wherein said accessory support accommodates a lens and a CMOS photosensor array;

wherein said CMOS photosensor array is disposed in said accessory support generally perpendicular to the longitudinal axis of said lens;

wherein said accessory support is configured so that when mounted to said mounting element attached at said windshield, said lens has a field of view through said windshield appropriate for a driver assistance system of the equipped vehicle;

wherein said driver assistance system comprises at least one of (i) an automatic headlamp control system of the equipped vehicle, (ii) a lane departure warning system of the equipped vehicle, (iii) an object detection system of the equipped vehicle, (iv) a traffic sign recognition system of the equipped vehicle, (v) a precipitation sensing system of the equipped vehicle and (vi) a collision avoidance system of the equipped vehicle; and wherein, when mounted to said mounting element attached at said windshield, said accessory support is positioned behind an area of said windshield that is wiped by a windshield wiper of the equipped vehicle when said windshield wiper is activated.

37. The accessory system of claim 36, wherein said accessory support comprises an electrical connector and wherein said electrical connector is configured for electrical connection to at least one of (i) an electrical source of the equipped vehicle, (ii) a power source of the equipped vehicle and (iii) a control of the equipped vehicle.

38. The accessory system of claim 37, wherein said accessory support comprises a holding portion configured to hold said lens.

39. The accessory system of claim 37, wherein said lens has a generally horizontal forward field of view through said windshield when said accessory support is mounted to said mounting element attached at said windshield.

40. An accessory system for a vehicle, said accessory system comprising:

a windshield, said windshield having an outer surface that is exterior of the vehicle when said windshield is mounted to a vehicle equipped with said accessory system and an inner surface that is interior of the vehicle when said windshield is mounted to the equipped vehicle;

wherein said windshield is at an angle relative to vertical when said windshield is mounted to the equipped vehicle;

a mirror mounting button adhesively attached at said inner surface of said windshield at a first location;

an interior rearview mirror assembly mounted to said mirror mounting button;

wherein said windshield has a mounting element adhesively attached at said inner surface at a second location;

an accessory support adapted for mounting to and demounting from said mounting element;

wherein said accessory support accommodates a lens and a CMOS photosensor array;

wherein said CMOS photosensor array is disposed in said accessory support generally perpendicular to the longitudinal axis of said lens;

wherein said accessory support is configured so that when mounted to said mounting element attached at said windshield, said lens has a field of view through said windshield appropriate for a driver assistance system of the equipped vehicle;

wherein said lens has a generally horizontal forward field of view through said windshield when said accessory support is mounted to said mounting element attached at said windshield;

wherein said driver assistance system comprises at least one of (i) an automatic headlamp control system of the equipped vehicle, (ii) a lane departure warning system of the equipped vehicle, (iii) an object detection system of the equipped vehicle, (iv) a traffic sign recognition system of the equipped vehicle, (v) a precipitation sensing system of the equipped vehicle and (vi) a collision avoidance system of the equipped vehicle;

wherein, when mounted to said mounting element attached at said windshield, said accessory support is positioned behind an area of said windshield that is wiped by a windshield wiper of the equipped vehicle when said windshield wiper is activated; and wherein said accessory support comprises an electrical connector and wherein said electrical connector is configured for electrical connection to at least one of (i) an electrical source of the equipped vehicle, (ii) a power source of the equipped vehicle and (iii) a control of the equipped vehicle.

* * * * *

UNITED STATES PATENT AND TRADEMARK OFFICE
CERTIFICATE OF CORRECTION

PATENT NO.         : 8,531,278 B2                                               Page 1 of 1
APPLICATION NO.    : 12/753433
DATED              : September 10, 2013
INVENTOR(S)        : Joshua L. DeWard et al.

It is certified that error appears in the above-identified patent and that said Letters Patent is hereby corrected as shown below:

In the Specification

Column 13
Line 53, "minor" should be --mirror--

In the Claims

Column 18
Line 2, insert --or privilege-- after "property"
Line 48, Claim 4, "minor" should be --mirror--
Line 50, Claim 5, "minor" should be --mirror--
Line 54, Claim 6, "minor" should be --mirror--
Line 56, Claim 6, "minor" should be --mirror--
Line 60, Claim 7, "minor" should be --mirror--
Line 62, Claim 7, "minor" should be --mirror--

Column 20
Line 3, Claim 16, "minor" should be --mirror--
Line 18, Claim 16, "minor" should be --mirror--
Line 20, Claim 16, "minor" should be --mirror--

Signed and Sealed this
Twelfth Day of August, 2014

Michelle K. Lee
*Deputy Director of the United States Patent and Trademark Office*